United States Patent
Asai et al.

(10) Patent No.: US 12,287,347 B2
(45) Date of Patent: Apr. 29, 2025

(54) ARTICLE INSPECTION VERIFICATION SYSTEM

(71) Applicant: ANRITSU CORPORATION, Kanagawa (JP)

(72) Inventors: Eiji Asai, Kanagawa (JP); Toshiaki Kikuchi, Kanagawa (JP); Takamasa Ito, Kanagawa (JP); Mami Ozawa, Kanagawa (JP); Tatsuya Inagaki, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 18/187,913

(22) Filed: Mar. 22, 2023

(65) Prior Publication Data
US 2023/0305029 A1    Sep. 28, 2023

(30) Foreign Application Priority Data
Mar. 24, 2022 (JP) .................. 2022-047874

(51) Int. Cl.
    *G01N 35/00* (2006.01)
    *B07C 5/18* (2006.01)
    (Continued)

(52) U.S. Cl.
    CPC ......... *G01N 35/00613* (2013.01); *B07C 5/18* (2013.01); *B07C 5/3416* (2013.01);
    (Continued)

(58) Field of Classification Search
    CPC ......... B07C 5/18; B07C 5/3416; B07C 5/344; G01N 35/00613
    (Continued)

(56) References Cited

U.S. PATENT DOCUMENTS
9,151,707 B2 * 10/2015 Lindner ................. G01N 21/00

FOREIGN PATENT DOCUMENTS
CN   211104698 U *  7/2020
JP   S59-053292 U    4/1984
(Continued)

OTHER PUBLICATIONS

Masayuki; Hidaka, "Article Inspection Device, Weight Inspection Device, and Foreign Matter Inspection Device" (English Translation), Nov. 30, 2006, worldwide.espacenet.com (Year: 2006).*

(Continued)

*Primary Examiner* — Michael McCullough
*Assistant Examiner* — Molly K Devine
(74) *Attorney, Agent, or Firm* — McDonald Hopkins LLC

(57) ABSTRACT

There is provided an article inspection verification system provided in an article inspection line including a plurality of article inspection devices that determine whether an inspection target article is a non-defective product or a defective product. The article inspection verification system includes physical effect generators that generate a physical effect that causes the inspection target article to be determined to be the defective product while the inspection target article passes through inspection sections corresponding each of article inspection devices, and a physical effect control unit that stores generation conditions of the physical effect by the physical effect generators and drives the physical effect generators in accordance with the generation conditions during an operation of the article inspection line.

16 Claims, 11 Drawing Sheets

(51) Int. Cl.
  *B07C 5/34* (2006.01)
  *B07C 5/344* (2006.01)
  *B65B 1/46* (2006.01)
  *G01N 23/083* (2018.01)
  *G01N 23/18* (2018.01)
  *G01V 3/10* (2006.01)

(52) U.S. Cl.
  CPC ............... *B07C 5/344* (2013.01); *B65B 1/46* (2013.01); *G01N 23/083* (2013.01); *G01N 23/18* (2013.01); *G01V 3/10* (2013.01); *G01N 2223/643* (2013.01)

(58) Field of Classification Search
  USPC ......................................................... 209/567
  See application file for complete search history.

(56) References Cited

FOREIGN PATENT DOCUMENTS

| JP | S60-25417 | A |   | 2/1985 | |
| --- | --- | --- | --- | --- | --- |
| JP | 1989019184 |   | * | 7/1987 | |
| JP | 2002-328059 | A |   | 11/2002 | |
| JP | 2006322750 | A | * | 11/2006 | |
| JP | 2009028674 | A | * | 2/2009 | |
| JP | 4588707 | B2 |   | 12/2010 | |
| JP | 2012173166 | A | * | 9/2012 | ............. G01G 11/04 |
| JP | 5431659 | B2 |   | 3/2014 | |
| JP | 5906070 | B2 |   | 4/2016 | |

OTHER PUBLICATIONS

Xiaofa; Lin, "Sanitary Appliance Production Line" (English Translation), Jul. 28, 2020, worldwide.espacenet.com (Year: 2020).*
Asai; Eiji, "Goods Inspection Sorting System, Inspection Apparatus and Sorting Apparatus" (English Translation), Feb. 12, 2009, worldwide.espacenet.com (Year: 2009).*
Matsumoto; Yoshiaki, "A Simulated Magnetic Field Signal Generation Device of the Adjustment of the Object Detection Apparatus for Inspection" (English Translation), Jan. 31, 1989, patentscope.wipo.int (Year: 1989).*
Junichi; Tamura, "Measuring Device" (English Translation), Sep. 10, 2012, worldwide.espacenet.com (Year: 2012).*

* cited by examiner

| Classification | Device | Recording Event | Additional data |
|---|---|---|---|
| Article detection sensor | Article inspection line entrance | Reception of article detection signal | Time point |
| | Metal detection section | Reception of article detection signal | Time point |
| | Weighing section | Reception of article detection signal | Time point |
| | X-Ray inspection section | Reception of article detection signal | Time point |
| | Return conveyor | Reception of article detection signal | Time point |
| | Article inspection line exit | Reception of article detection signal | Time point |
| Magnetic field fluctuation generator | Variable resistor | Set of resistance value | Time point and setting value |
| | Relay circuit | ON/OFF of output of control signal | Time point |
| | Relay operation monitor | ON/OFF of reception of monitor signal | Time point |
| Weight position controller | Motor 1 (weight 1) | ON of rising operation command<br>ON of lowering operation command | Time point |
| | Motor 2 (weight 2) | ON of rising operation command<br>ON of lowering operation command | Time point |
| Test piece insertion controller | Cylinder (motor) | Proceeding. command output ON or control start<br>Retracting. command output ON or control start | Time point |
| Operation detection sensor of distribution mechanism | Sorting conveyor | ON of operation command or control start | Time point |
| | Flipper arm 1 (left and right)<br>Flipper arm 2 (left and right) | High/Low of signal level indicating arm position or rising/falling of signal level | Time point |

Data : "20220301132115134, 001, A01, , ,"
  Time point (Time stamp)  Device ID  Event code
  (13:21:15.134 March 1, 2022)

Data : "20220301132118547, 101, S00, 02, ,"
  Time point (Time stamp)  Device ID  Event code  Setting value
  (13:21:18.547 March 1, 2022)

FIG. 10

ARTICLE INSPECTION VERIFICATION SYSTEM

TECHNICAL FIELD

The present invention relates to an article inspection verification system, and more particularly to an article inspection verification system suitable for periodically verifying whether or not a defect detection function and a defect sorting function by an article inspection are normal.

BACKGROUND ART

In an article inspection device or an article inspection system that includes the article inspection device that inspects a conveyed article and a rejection device that operates in accordance with the article inspection result, conventionally, the reliability of quality management by an article inspection is ensured in a manner that it is checked whether or not the normal defect detection function is maintained at required detection sensitivity or accuracy, by periodic operation verification using a pseudo-defective sample (referred to as a pseudo-defective product below) using a defective sample and a so-called test piece that affect an inspection unit in the article inspection device.

For example, in an X-ray inspection device, a metal detection device, a weighing device, an appearance inspection device, and other various article inspection devices installed in inspection lines for fresh foods and manufacturing lines for processed foods and pharmaceuticals, or various article inspection systems including both such an article inspection device and a post-stage device that rejects a conveyance destination of an inspection target article or sorts and discharges a defective product to the outside of the manufacturing line in accordance with the inspection result, at the start of the manufacturing line, during an operation, at the end of the manufacturing line, and the like, verification work, for example, in which the pseudo-defective product is caused to flow through the manufacturing line, and it is checked whether or not a detection operation of the pseudo-defective product or an operation of the post-stage device, which is required to be operated at the time of defect detection, has an abnormality, and the operation check result is recorded is performed.

As the conventional article inspection device and article inspection system that perform such verification work, for example, there is known an article inspection device that sets a trial operation check mode (so-called test mode) in which the defect detection function of the article inspection device and the operation of the post-stage device at the time of defect detection can be checked, in addition to a normal operation mode in which an article inspection is performed by using, as the inspection target article, articles sequentially conveyed, and enables mode switching to the test mode during the verification work to facilitate the verification work (see Patent Document 1, for example).

Further, there is known an article inspection device in which, by attaching a plurality of types of test pieces tp1 and tp2 as foreign matter samples to a product 102 to produce a pseudo-defective product, transition to a test mode in which whether or not functions of identifying the foreign matter samples tp1 and tp2 and detecting a plurality of types of foreign matters with required sensitivity in accordance with the product type of the inspection target article are correctly exhibited can be performed based on the detection signal of a foreign matter detection device 100 when passing through the pseudo-defective product, and accurate operation check and the result output can be performed, as illustrated in FIG. 11 (see Patent Document 2, for example).

There is known an article inspection device that enables check and correction of changes in weighing sensitivity over time due to adhesive objects and deposits from an inspection target article without stopping the manufacturing line in a weighing sorting machine installed in a manufacturing line (see Patent Documents 3 and 4).

In addition, there is known an article inspection device in which, in a metal detector that detects a metallic foreign matter in an inspection object by detecting fluctuations in the magnetic field in an inspection region, by opening and closing the loop circuit to fluctuate the magnetic field, a pseudo-metal detection signal is generated without using a foreign matter sample or a predetermined foreign matter sample is inserted into the inspection region by an actuator, and, in this manner, the performance check of an inspection device is performed without human intervention (see Patent Documents 5 and 6).

RELATED ART DOCUMENT

Patent Document

[Patent Document 1] Japanese Patent No. 5906070
[Patent Document 2] Japanese Patent No. 5431659
[Patent Document 3] JP-A-60-25417
[Patent Document 4] JP-A-2002-328059
[Patent Document 5] JP-UM-A-59-053292
[Patent Document 6] Japanese Patent No. 4588707

DISCLOSURE OF THE INVENTION

Problem That the Invention is to Solve

However, in the conventional article inspection device and article inspection system as described above, in a case where the defect detection function of the article inspection device and the operation of the post-stage device at the time of defect detection are checked, there are problems that it is necessary to perform a trial operation check operation in a state where a pseudo-defective product is produced, or to perform a trial operation check operation by switching the mode to the test mode, and the normal operation of the manufacturing line is forced to stop.

Therefore, in particular, in a large number of manufacturing lines in which article inspection devices are disposed, in a case where the defect detection function of the article inspection device in each manufacturing line and the operation of the post-stage device at the time of defect detection are verified with relatively high frequency, for example, in a case where the defect detection operation corresponding to the pseudo-defective product flowing through an article inspection section and a rejection operation at the subsequent stage are checked at short intervals of about 1 hour, there is also a problem that not only the operating rate of the manufacturing line decrease, but the work burden of the verification work became very large.

Further, many manufacturing lines are provided with a plurality of article inspection devices with different inspection functions and inspection performance, and it is not realistic to upgrade all article inspection devices to have an operation check function and a verification function at the same time. In addition, it is very difficult to update the software when the manufacturer and the year of manufacture are different. In addition, such an operation check function and a verification function are usually installed in each article inspection device, and it is not possible to cooperate between devices. Thus, it is necessary to stop the operation, perform the verification work is performed, and then record the result, and organize the records. Accordingly, there is a concern that the finding of the problem is delayed.

In a case where the verification work of each article inspection device is sequentially performed in an inspection process of a manufacturing line in which a plurality of types of article inspection devices are disposed in series, the operation of a sorting process at the subsequent stage is determined by whether any article inspection device detects a defective product. There is also a problem that, in order to perform verification including the sorting process, the verification work is required to be performed in not so-called test mode but the normal operation mode under an actual operation condition. Consequently, the overall verification work for an inspection and sorting process has difficulty.

An object of the present invention is to provide an article inspection verification system that prevents a reduction in operating rate associated with verification work of a defect detection function of an article inspection device and reduces a burden of the verification work. Another object of the present invention is to reliably and efficiently realize verification work in an inspection and sorting process of a manufacturing line configured by a plurality of types of article inspection devices.

Means for Solving the Problem

In order to achieve the above objects, according to a first aspect of the present invention, an article inspection verification system is provided in an article inspection line including an article inspection device that inspects a quality state of an inspection target article passing through an inspection section on an article conveyance path and determines whether the inspection target article is a non-defective product or a defective product based on a predetermined determination condition. The article inspection verification system includes a physical effect generator that generates a physical effect that causes the article inspection device to determine that the inspection target article passing through the inspection section is the defective product, and a physical effect control unit that stores a generation condition for the physical effect by the physical effect generator and drives the physical effect generator during an operation of the article inspection line in accordance with the generation condition.

With this configuration, in the article inspection verification system according to the first aspect of the present invention, the physical effect generator is driven by the physical effect control unit during the operation of the article inspection line, so that the physical effect that causes the inspection target article passing through the inspection section to be determined to be a defective product is generated in this section. Therefore, it is possible to generate a pseudo-defective product by a control from the article inspection verification system during the operation of the article inspection line without affecting the inspection target article passing through the inspection section, and to verify whether or not a defect detection operation of the article inspection device on the inspection target article made to be the defective product at this time is normal.

According to a second aspect of the present invention, the article inspection verification system in the first aspect further includes a verification information storage unit that stores verification information indicating whether or not a defect detection operation of the article inspection device is normal, when the article inspection device determines the inspection target article passing through the inspection section within a specific period during the operation to be the defective product by the physical effect generator driving based on the generation condition.

In this case, when the inspection target article passing through the inspection section within a specific period during the operation of the article inspection line is determined to be the defective product, the verification information storage unit stores the verification information indicating whether or not the defect detection operation of the article inspection device is normal, to be able to be recorded and output. Thus, the verification work of checking the periodic defect detection operation and recording the result is greatly facilitated.

According to a third aspect of the present invention, in the article inspection verification system in the first aspect, the article inspection line includes, on a downstream side of the inspection section on the article conveyance path, a defective product rejection mechanism that moves the inspection target article determined to be the defective product in a direction away from a conveyance route of the non-defective product on the article conveyance path, and the article inspection verification system further includes a return conveyance mechanism that moves the inspection target article between the inspection section and a defective product rejection section by the defective product rejection mechanism to an upstream side of the article conveyance path while bypassing the inspection section, the inspection target article being determined to be the defective product by the physical effect from the physical effect generator when passing through the inspection section.

In this case, by providing the return conveyance mechanism that moves, to the upstream side of the article conveyance path, the inspection target article determined to be the defective product when passing through the inspection section, between the inspection section of the article inspection line and the defective product rejection section by the defective product rejection mechanism on the downstream side of the inspection section while bypassing the inspection section, it is possible to return an article that is made to be an uninspected article used for a pseudo-defective product, that is, a pseudo-defective product, and in which the normal inspection result is not obtained, to the upstream side and to perform a normal inspection again, for example.

According to a fourth aspect of the present invention, in the article inspection verification system in the second aspect, the article inspection line includes, on a downstream side of the inspection section on the article conveyance path, a defective product rejection mechanism that moves the inspection target article determined to be the defective product in a direction away from a conveyance route of the non-defective product on the article conveyance path, and the article inspection verification system further includes a return conveyance mechanism that moves the inspection target article between the inspection section and a defective product rejection section by the defective product rejection mechanism to an upstream side of the article conveyance path while bypassing the inspection section, the inspection target article being determined to be the defective product by the physical effect from the physical effect generator when passing through the inspection section.

In this case, by providing the return conveyance mechanism that moves, to the upstream side of the article conveyance path, the inspection target article determined to be the defective product when passing through the inspection section, between the inspection section of the article inspection line and the defective product rejection section by the defective product rejection mechanism on the downstream side of the inspection section while bypassing the inspection section, it is possible to return an article that is made to be an uninspected article used for a pseudo-defective product, that is, a pseudo-defective product, and in which the normal inspection result is not obtained, to the upstream side and to perform a normal inspection again, for example.

According to a fifth aspect of the present invention, in the article inspection verification system in the first aspect, the article inspection line includes a first article inspection device and a second article inspection device having a plurality of different inspection types, as the article inspection device.

With this configuration, the article inspection line includes the first article inspection device and the second article inspection device having a plurality of different inspection types, and a plurality of types of physical effect generators corresponding to the inspection types of the first and second article inspection devices are provided. Thus, it is possible to continuously verify a plurality of types of article inspection and rejection function on the same inspection object in the same article inspection line.

According to a sixth aspect of the present invention, in the article inspection verification system in the second aspect, the article inspection line includes a first article inspection device and a second article inspection device having different inspection types, as the article inspection device.

With this configuration, the article inspection line includes the first article inspection device and the second article inspection device having a plurality of different inspection types, and a plurality of types of physical effect generators corresponding to the inspection types of the first and second article inspection devices are provided. Thus, it is possible to continuously verify a plurality of types of article inspection and rejection function on the same inspection object in the same article inspection line.

According to a seventh aspect of the present invention, in the article inspection verification system in the third aspect, the article inspection line includes a first article inspection device and a second article inspection device having different inspection types, as the article inspection device.

With this configuration, the article inspection line includes the first article inspection device and the second article inspection device having a plurality of different inspection types, and a plurality of types of physical effect generators corresponding to the inspection types of the first and second article inspection devices are provided. Thus, it is possible to continuously verify a plurality of types of article inspection and rejection function on the same inspection object in the same article inspection line.

According to an eighth aspect of the present invention, in the article inspection verification system in the fifth aspect, the physical effect control unit drives the physical effect generator with respect to at least one of the first article inspection device and the second article inspection device for a specific inspection target article.

With this configuration, when the article inspection line includes the first article inspection device and the second article inspection device having a plurality of different inspection types, it is possible to verify an overall operation of an article inspection system 1 when any one or both article inspection devices detect a defect, by exhaustive combinations.

According to a ninth aspect of the present invention, in the article inspection verification system in the sixth aspect, the physical effect control unit drives the physical effect generator with respect to at least one of the first article inspection device and the second article inspection device for a specific inspection target article.

With this configuration, when the article inspection line includes the first article inspection device and the second article inspection device having a plurality of different inspection types, it is possible to verify an overall operation of an article inspection system 1 when any one or both article inspection devices detect a defect, by exhaustive combinations.

According to a tenth aspect of the present invention, the article inspection verification system in the fifth aspect further includes a first defective product rejection mechanism that moves an inspection target article determined to be a defective product by the first article inspection device in a direction away from a conveyance route of the non-defective product on the article conveyance path, and a second defective product rejection mechanism that moves an inspection target article determined to be a defective product by the second article inspection device in the direction away from the conveyance route of the non-defective product on the article conveyance path, the first defective product rejection mechanism and the second defective product rejection mechanism being provided on a downstream side of the inspection section on the article conveyance path, and an operation detection sensor that detects operation states of the first defective product rejection mechanism and the second defective product rejection mechanism.

With this configuration, the first and second defective product rejection mechanisms that move the inspection target article determined to be the defective product by the first and second article inspection devices in the direction away from a non-defective product conveyance route are provided on the downstream side of the inspection section on the article conveyance path. Thus, it is possible to detect an operation state of a rejection mechanism in a sorting device at the subsequent stage for an article determined to be defective by any one or a plurality of article inspection devices among the plurality of types of article inspection devices. In addition, it is possible to also verify whether this article is rejected to a correct discharge destination.

According to an eleventh aspect of the present invention, in the article inspection verification system in the first aspect, the article inspection device includes a metal detection device that detects a metal component in the inspection target article, and the physical effect generator includes a magnetic field fluctuation generator that fluctuates a magnetic field in the inspection section in accordance with a control signal from the physical effect control unit.

In this case, by generating a magnetic field fluctuation that affects the metal detection device, it is possible to automatically generate a pseudo-defective product for the metal detection device during the operation of the article inspection line without affecting the inspection target article passing through the inspection section for metal detection. In addition, it is possible to verify whether or not a defect detection operation of the metal detection device on the inspection target article made to be the defective product at this time is normal.

The magnetic field fluctuation generator can use an element capable of affecting the magnetic field generated by the metal detection device, such as a coil, which can be switched in one turn or within a predetermined number of turns to change the impedance.

According to a twelfth aspect of the present invention, in the article inspection verification system in the second aspect, the article inspection device includes a metal detection device that detects a metal component in the inspection target article, and the physical effect generator includes a magnetic field fluctuation generator that fluctuates a magnetic field in the inspection section in accordance with a control signal from the physical effect control unit.

In this case, by generating a magnetic field fluctuation that affects the metal detection device, it is possible to automatically generate a pseudo-defective product for the metal detection device during the operation of the article inspection line without affecting the inspection target article passing through the inspection section for metal detection. In addition, it is possible to verify whether or not a defect detection operation of the metal detection device on the inspection target article made to be the defective product at this time is normal.

The magnetic field fluctuation generator can use an element capable of affecting the magnetic field generated by the metal detection device, such as a coil, which can be switched in one turn or within a predetermined number of turns to change the impedance.

According to a thirteenth aspect of the present invention, in the article inspection verification system in the first aspect, the article inspection device includes a weighing device that weighs the inspection target article, and the physical effect generator includes a loading/unloading mechanism that adds or/and removes a weight load to or/and from a weight of the inspection target article in the inspection section in accordance with a control signal from the physical effect control unit.

In this case, by a loading/unloading operation of a load, which affects a weighed value, it is possible to automatically generate a pseudo-defective product for the weighing device during the operation of the article inspection line without affecting the inspection target article passing through a weighing inspection section. In addition, it is possible to verify whether or not a defect detection operation of the weighing device on the inspection target article made to be the defective product at this time is normal.

According to a fourteenth aspect of the present invention, in the article inspection verification system in the second aspect, the article inspection device includes a weighing device that weighs the inspection target article, and the physical effect generator includes a loading/unloading mechanism that adds or/and removes a weight load to or/and from a weight of the inspection target article in the inspection section in accordance with a control signal from the physical effect control unit.

In this case, by a loading/unloading operation of a load, which affects a weighed value, it is possible to automatically generate a pseudo-defective product for the weighing device during the operation of the article inspection line without affecting the inspection target article passing through a weighing inspection section. In addition, it is possible to verify whether or not a defect detection operation of the weighing device on the inspection target article made to be the defective product at this time is normal.

According to a fifteenth aspect of the present invention, in the article inspection verification system in the first aspect, the article inspection device includes an X-ray inspection device that irradiates an inspection target article passing through the inspection section on the article conveyance path with X-rays, and performs article inspection based on rejection of transmitted X-ray amount, and the physical effect generator includes a test piece movement mechanism that enters and retreats a test piece having a predetermined X-ray transmission characteristic into and from the inspection section in accordance with a control signal from the physical effect control unit.

In this case, by taking the test piece affecting an X-ray inspection in and out from the inspection section, it is possible to automatically generate a pseudo-defective product for the X-ray inspection device during the operation of the article inspection line without affecting the inspection target article passing through an X-ray inspection section. In addition, it is possible to verify whether or not a defect detection operation of the X-ray inspection device on the inspection target article made to be the defective product at this time is normal.

According to a sixteenth aspect of the present invention, in the article inspection verification system in the second aspect, the article inspection device includes an X-ray inspection device that irradiates an inspection target article passing through the inspection section on the article conveyance path with X-rays, and performs article inspection based on rejection of transmitted X-ray amount, and the physical effect generator includes a test piece movement mechanism that enters and retreats a test piece having a predetermined X-ray transmission characteristic into and from the inspection section in accordance with a control signal from the physical effect control unit.

In this case, by taking the test piece affecting an X-ray inspection in and out from the inspection section, it is possible to automatically generate a pseudo-defective product for the X-ray inspection device during the operation of the article inspection line without affecting the inspection target article passing through an X-ray inspection section. In addition, it is possible to verify whether or not a defect detection operation of the X-ray inspection device on the inspection target article made to be the defective product at this time is normal.

According to a seventeenth aspect of the present invention, in the article inspection verification system in the eleventh aspect, the physical effect control unit variably sets an output condition for the control signal to the physical effect generator in accordance with a type of the inspection target article.

With this configuration, it is possible to generate an accurate physical effect in the inspection section in accordance with the product type and to perform more effective verification work for article inspection.

According to an eighteenth aspect of the present invention, in the article inspection verification system in the thirteenth aspect, the physical effect control unit variably sets an output condition for the control signal to the physical effect generator in accordance with the type of the inspection target article.

With this configuration, it is possible to generate an accurate physical effect in the inspection section in accordance with the product type and to perform more effective verification work for article inspection.

According to a nineteenth aspect of the present invention, in the article inspection verification system in the fifteenth aspect, the physical effect control unit variably sets an output condition for the control signal to the physical effect generator in accordance with a type of the inspection target article.

With this configuration, it is possible to generate an accurate physical effect in the inspection section in accordance with the product type and to perform more effective verification work for article inspection.

Advantage of the Invention

According to the present invention, it is possible to provide an article inspection verification system in which it is possible to automatically generate a pseudo-defective product for each article inspection device during the operation of the article inspection line without affecting the inspection target article passing through the inspection section and to verify whether or not the defect detection operation of the article inspection device is normal, and it is possible to prevent a reduction in operating rate associated with verification work and greatly reduces a verification work burden.

BRIEF DESCRIPTION OF THE DRAWINGS

FIGS. 7A to 7C are diagrams of a weight loading/unloading state of the weight position controller in the article inspection verification system according to the embodiment of the present invention, in which FIG. 7A illustrates a normal state in which a first weight of two weights selectively loaded on the weighing stand and a second weight is unloaded, FIG. 7B illustrates a state on a light side on which the first weight and the second weight are unloaded together, that is the state at −NG, and FIG. 7C illustrates a state on an excessive side on which the first weight and the second weight are loaded together, that is the state at +NG.

FIG. 10 is an example of a list showing an output form of a verification result obtained by the article inspection verification system according to each embodiment of the present invention.

BEST MODE FOR CARRYING OUT THE INVENTION

Hereinafter, embodiments according to the present invention will be described with reference to the drawings.

One Embodiment

FIGS. 1A to 8 illustrate an article inspection verification system according to one embodiment of the present invention.

First, the overall schematic configuration of the present embodiment will be described.

Figure 1A:
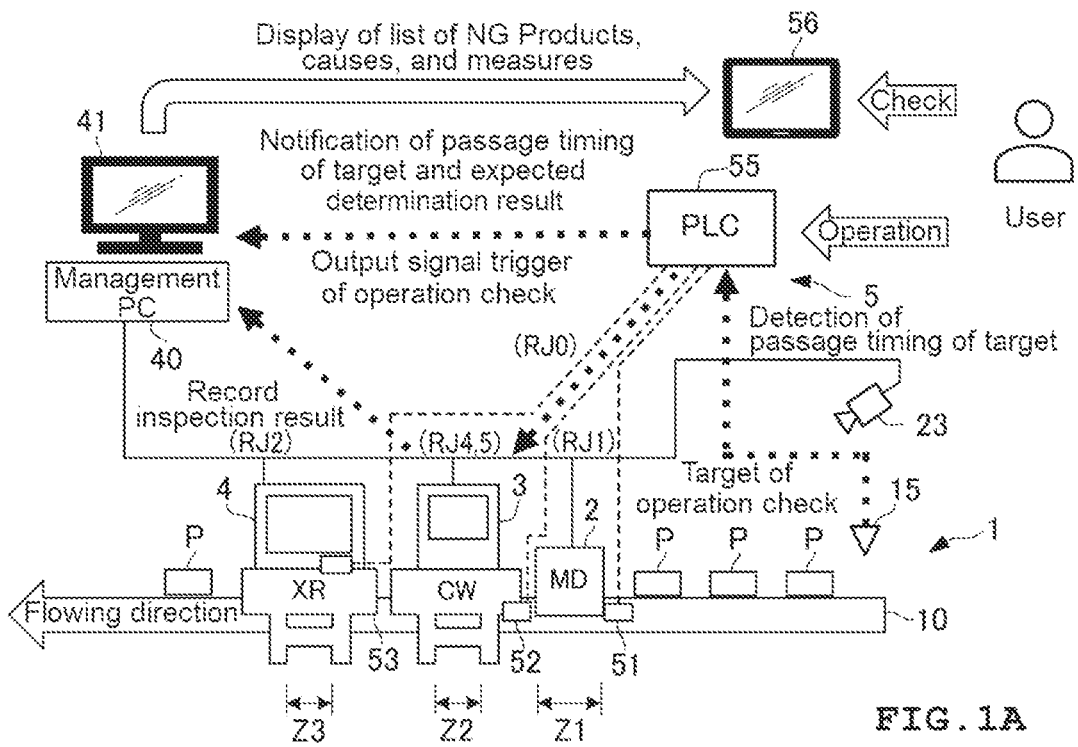
FIG. 1A is a schematic system configuration diagram of an article inspection verification system according to one embodiment of the present invention.
Figure 1B:
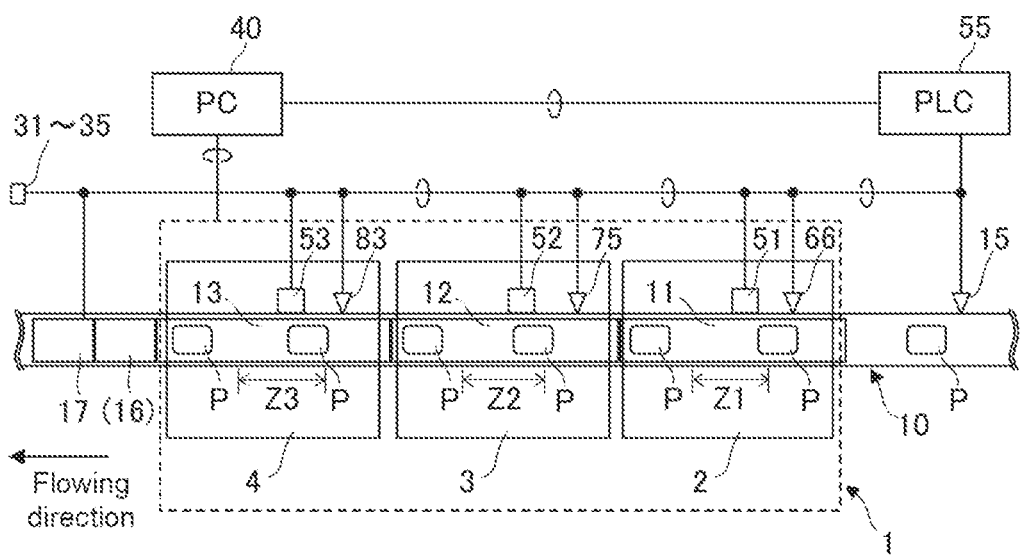
FIG. 1B is a schematic diagram illustrating arrangement and connection of devices constituting the main part of an article inspection system and the article inspection verification system.
Figure 2:
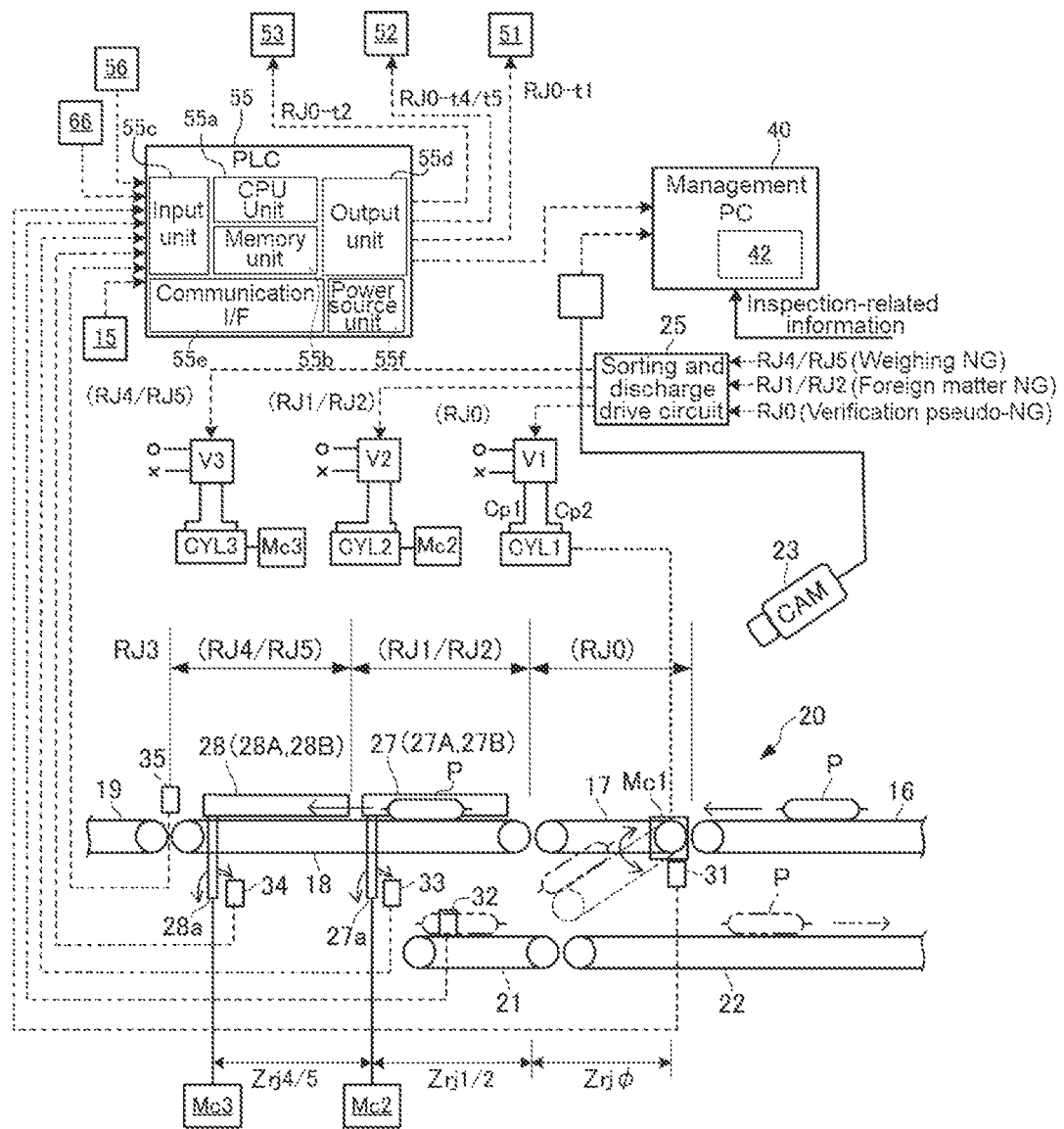
FIG. 2 is a configuration diagram of a main part of the article inspection verification system according to the embodiment of the present invention.

As illustrated in FIGS. 1A, 1B and 2, one embodiment of the present invention is configured as an article inspection verification system 5 capable of periodically verifying whether or not a defect detection function of an article inspection system 1 is normal under an operating state of the article inspection system 1 constituting an article inspection line. Although the details will be described later, in the article inspection system 1, an article P being conveyed on an article conveyance path 10 on the downstream side of an article manufacturing line is sequentially inspected, and the article P determined to be a defective product is sorted and discharged from a normal product conveyance path of the article conveyance path 10.

As illustrated in FIGS. 1A and 1B, the article inspection system 1 includes a metal detection device 2, a weighing device 3, and an X-ray inspection device 4 (also referred to as a plurality of types of article inspection devices 2 to 4 below) as a plurality of article inspection devices arranged along the article conveyance path 10. The plurality of types of article inspection devices 2 to 4 inspect a quality state of each inspection target article P (simply referred to as an article P below) passing through a plurality of inspection sections Z1, Z2, and Z3 on the article conveyance path 10 by inspection methods different for the inspection sections Z1, Z2, and Z3, and determine whether the article is an OK product (that is, a non-defective product) or an NG product (that is, a defective product) based on a predetermined determination condition corresponding to each inspection section Z1, Z2, or Z3.

The article inspection system 1 may include other article inspection devices, such as an appearance inspection device that detects a defect in the shape of the product or in the sealing portion of a packaging bag. In addition, the article P is, for example, food (fresh food or processed food) or medicine that is ingested by humans or animals, or is manufactured as a product that is attached to or touched by humans or animals. The article P is not limited to a specific article.

The article inspection system 1 includes the plurality of types of article inspection devices 2 to 4 arranged in order from the upstream side along the article conveyance path 10 as illustrated in FIG. 1A and a sorting device 20 located on the downstream side of the article inspection devices 2 to 4 as illustrated in FIGS. 1B and 2. A control unit (details not illustrated) of each of the article inspection devices 2, 3, and 4 is network-connected to a management PC 40 LAN-connected, and can transmit and receive inspection-related information and various control signals.

The plurality of types of article inspection devices 2 to 4 have conveyors 11, 12, and 13, respectively, and form a portion of the article conveyance path 10.

The sorting device 20 includes a plurality of conveyors 17, 18, and 19 forming the article conveyance path 10 following a relay conveyor 16 provided on the downstream side of the article inspection devices 2 to 4. The conveyor 17 on the upstream side is used as a dropout type sorting conveyor, and the sorting device 20 further includes a plurality of stages of flipper type rejection mechanisms 27 and 28 that performs a rejection operation to a conveyance path width side on the conveyor 18 continuing the downstream side. The relay conveyor 16 may be integrated with the conveyor 13 of the article inspection device 4.

The conveyor 17 functioning as the dropout type sorting conveyor does not reject articles P associated with the inspection results of the plurality of types of article inspection devices 2 to 4 in the article inspection system 1, and collects the article P that is associated with a verification operation of the article inspection verification system 5 and is used for verification, through a return conveyance route (described later) without discharging such an article P to the conveyor 18 on the downstream side. Therefore, in the present embodiment, in a case of being viewed from the plurality of types of article inspection devices 2 to 4 in the article inspection system 1, the conveyor 17 simply functions as a conveyance conveyor.

The components of the article inspection system 1 (article inspection line), which are similar to those in the related art are assumed here to be configured in substantially the similar manner to an inspection line disclosed in JP-A-2019-212234, for example. The detailed configuration description of a management system that outputs inspection result information to the plurality of types of article inspection devices 2 to 4 and to a host computer connected to each of the article inspection devices 2 to 4 via a computer network will be omitted except for portions described later. However, the plurality of types of article inspection devices 2 to 4 are not limited to specific types.

That is, the article inspection verification system 5 is also characterized in that conventionally known and existing article inspection devices can be used as the plurality of article inspection devices 2 to 4 constituting the article inspection system 1. That is, as illustrated in FIGS. 1A, 1B and 2, an inspection and sorting function by the article inspection devices 2 to 4 are independent of a verification function by the article inspection verification system 5.

For example, the metal detection device 2 may include a detection unit that detects fluctuation in the magnetic field in an inspection region when the article P passes through an inspection section (see JP-A-2018-200197). In addition, the weighing device 3 may have a configuration of an electromagnetic balance scale or a configuration of an electric resistance wire scale (load cell) (see JP-A-2016-205846, JP-A-2020-122677, and the like). Furthermore, the X-ray inspection device 4 may be configured as, for example, an X-ray foreign matter detection device (see Patent Documents 1 and 2, and the like), and the content of image processing and quality determination processing may differ depending on an inspection target.

The article conveyance path 10 may include a plurality of belt conveyor type return conveyance conveyors 21 and 22 that form a dedicated return conveyance route for returning an article P used for verification of the plurality of types of article inspection devices 2 to 4 and the sorting device 20 to the upstream side, in addition to the plurality of belt conveyor type conveyors 11, 12, and 13 that pass through the inspection sections Z1, Z2, and Z3 of the plurality of types of article inspection devices 2 to 4 and are driven at substantially the predetermined same conveyance speed, and the plurality of belt conveyor type conveyors 16, 17, 18, and 19 that pass through a sorting section by the sorting device 20 and spaces before and after the sorting section and are driven at substantially the same conveyance speed as the plurality of conveyors 11 to 13. In the conveyor 17 as a sorting conveyor, a pair of rollers for supporting an endless conveyor belt are supported by a common shaft support frame. A sorting drive actuator for swinging the shaft support frame up and down is interposed between the shaft support frame and the support of the conveyor 17. A swing drive mechanism of such a drop-down type sorting conveyor may be configured in the similar manner to that disclosed in JP-A-2018-150130, for example.

Further, as illustrated in FIG. 2, a pair of flipper arms 27A and 27B and a pair of flipper arms 28A and 28B are arranged on both sides of the conveyor 18 of the sorting device 20 to constitute the rejection mechanisms 27 and 28. The articles P are rejected in accordance with whether the articles P are carried straight in a conveyance direction of the article conveyance path 10 or discharged sideways. Such a flipper-type sorting conveyor may be configured in the similar manner to that disclosed in JP-A-2019-001591, for example.

As illustrated in FIGS. 1A and 1B, the article inspection verification system 5 includes a magnetic field fluctuation generator 51 (may also be a metal piece insertion mechanism), a weight position controller 52 attached to the weighing device 3, and a test piece insertion controller 53 attached to the X-ray inspection device 4, as a plurality of types of physical effect generators that generate a physical effect that causes an article P to be determined to be a defective product, in each of the plurality of inspection sections Z1, Z2, and Z3. The magnetic field fluctuation generator 51 generates pulse-shaped magnetic field fluctuation (one type of noise from the metal detection device 2) in an inspection magnetic field of the metal detection device 2. The magnetic field fluctuation generator 51, the weight position controller 52, and the test piece insertion controller 53 are also collectively referred to as a plurality of types of physical effect generators 51, 52, and 53.

In addition, the article inspection verification system 5 includes a PLC (programmable logic controller) 55 as a physical effect control unit. As illustrated in FIG. 1A, the article inspection verification system 5 may include a tablet type information terminal 56 that functions as a programming tool and a setting input switcher for the PLC 55 in cooperation with the management PC 40.

The management PC 40 here can execute a program that can sequentially receive inspection-related information representing inspection results of the plurality of types of article inspection devices 2 to 4, and can execute an analysis program for performing various analyzes in combination with various types of data output from the PLC 55, in addition to functioning as a data recording unit that stores the received inspection data in a storage medium.

The PLC 55 is configured to store, as a program list for sequence control in advance, generation conditions for physical effects by the plurality of physical effect generators 51, 52, and 53, that is, the control procedure for each of the physical effect generators 51, 52, and 53, and to enable causing the article inspection devices 2, 3, and 4 to determine the article P passing through the inspection sections Z1, Z2, and Z3 within a specific period during the operation to be defective products, by driving the physical effect generators 51 to 53 during the operation of the article inspection system 1 in accordance with the respective generation conditions.

The specific period during the operation referred to here is, for example, time when the inspection line is started, when the inspection line is in operation, and when the inspection line is ended. Specifically, the specific period is a period corresponding to a period during a predetermined inspection time at the start of inspection as the start of the inspection line or during an inspection within a predetermined number of inspections, within a predetermined inspection time for each predetermined time elapse after the start of the inspection, and within a predetermined inspection time at the end of the inspection as the end of the inspection line. Each predetermined time elapse after the start of the inspection is preferably every hour after the start of the inspection.

Even within such a specific period during the operation, the plurality of types of article inspection devices 2 to 4 in the article inspection system 1 continue the normal article inspection without receiving a setting change operation such as switching the operation mode.

The PLC 55 has functions to set an article P as a verification target article based on a detection signal when an article detection sensor 15 detects the article P carried in within the specific period during the operation of the article inspection system 1 at the entrance side of the article inspection system 1, to drive and control any one of the physical effect generators 51 to 53 in accordance with a timing when the verification target article passes through the respective inspection sections Z1 to Z3 of the plurality of types of article inspection devices 2 to 4, and to generate verification data as an operation record.

At this time, how to drive and control the physical effect generators 51 to 53 corresponding to any of the plurality of types of article inspection devices 2 to 4 may be set in the PLC 55 in advance as a verification schedule. Alternatively, the verification schedule may be received as data from the management PC 40. Further, a plurality of verification patterns (PT01, PT02, and the like) may be stored in the PLC 55, and the verification pattern to be executed may be designated from the plurality of stored verification patterns in the verification schedule. When the verification patterns are set, verification record can be easily kept which one of the verification patterns has been applied.

The timing when the article P as an inspection target passes through the inspection sections Z1, Z2, and Z3 is set in advance based on the detection signal from the article detection sensor 15 that detects the carrying-in of the article P to the article inspection system 1. Article detection sensors 66, 75, and 83 (may be 84 in FIGS. 9A to 9D) capable of detecting the carrying-in into each of the inspection sections Z1, Z2, and Z3 are provided near the upstream side of each of the inspection sections Z1 to Z3, so as to reduce the effects of the shift in a conveyance timing of the article P that may occur on the article conveyance path 10 and fluctuations in the conveyance speeds of the conveyors 11 to 13.

In addition, the PLC 55 may be able to verify the operation of the sorting device 20 in the article inspection system 1 by receiving a monitoring image of a camera 23 that inputs a line monitoring image to the management PC 40, pieces of detection information of a plurality of operation detection sensors 31, 33, and 34 that detect the operation state of the dropout type sorting conveyor 17 of the sorting device 20 and the operation states of the plurality of stages of flipper type rejection mechanisms 27 and 28, detection information of a return article detection sensor 32 that detects the article P sorted out in a dropout manner, detection information of a non-defective product passage detection sensor 35, and the like in addition to the detection signals of the article detection sensors 15, 66, 75, and 83 (84) for carrying-in detection and determination result information from the plurality of types of article inspection devices 2 to 4.

Specifically, as illustrated in FIG. 2, the PLC 55 executes, for example, a sequence control program rewritable by a programming tool in the order of step numbers in a program list. The PLC 55 includes a CPU unit 55*a* that is an arithmetic control unit for program execution, a memory unit 55*b* configured by various memories that readably store a circuit programs and commands including various command words and devices (operands) in order of step number, an input unit 55*c* that takes in input information from an external sensor, switches, or the like, an output unit 55*d* that outputs an arithmetic result from the CPU unit 55*a* to the outside, a communication I/F 55*e* that is an interface for enabling communication connection to the plurality of types of physical effect generators 51, 52, and 53, the higher management PC 40, and the tablet type information terminal 56, and a power source unit 55*f*.

In a case where the article inspection verification system 5 is retrofitted to the existing article inspection system 1, a management system is constructed using a management PC for taking in and recording the detection signal of the article detection sensor 15 for detection carrying-in described above, the determination result information of the plurality of types of article inspection devices 2 to 4, and the like.

Thus, in the article inspection verification system 5, the PLC 55 may mainly perform the control of the verification operation of each article inspection device and the generation of the operation record while cooperating with the management system that has already been constructed, and the verification data may be output to the management PC 40.

The PLC 55 referred to here is a preferred example of a unit including a port capable of inputting and outputting a control signal and a microprocessor that executes the related control programs, and the like, for realizing each function in the embodiment of the present invention. The specific device configuration is not specified.

Figure 3A:
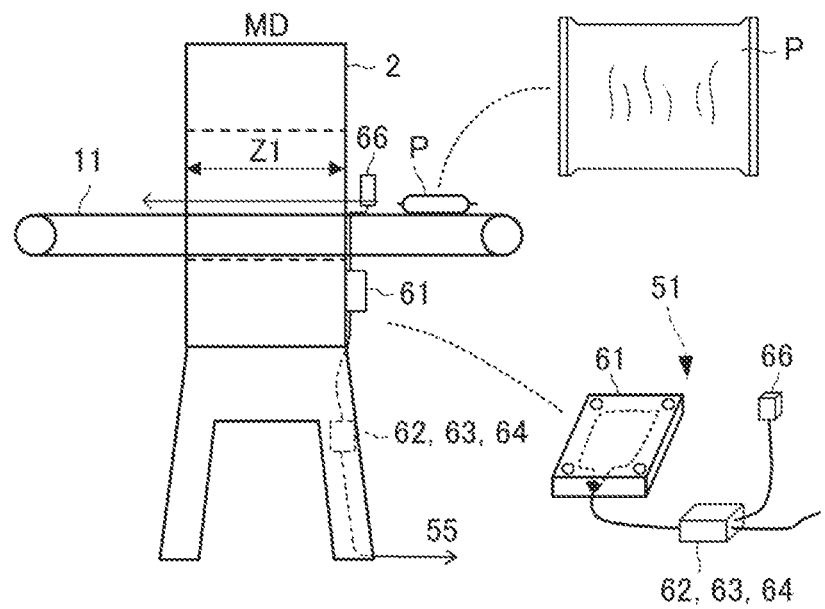
FIG. 3A is a schematic diagram of a metal effect noise generator in the article inspection verification system according to the embodiment of the present invention.
Figure 3B:
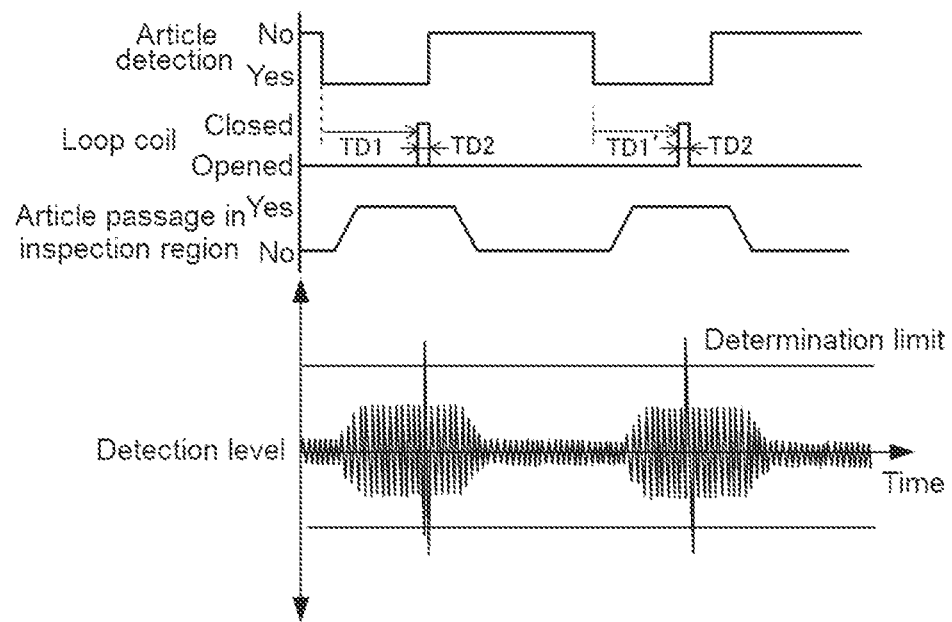
FIG. 3B illustrates a graph of a noise effect of an experimental result showing an article effect of a conveyed article detected by a metal detection device in the article inspection system and an effect value fluctuation due to metal effect noise detected to be superimposed on the article effect, in association with an operation of the article inspection verification system, in which a vertical axis of the graph indicates an effect value detected by the metal detection device, and a horizontal axis indicates time.
Figure 4:
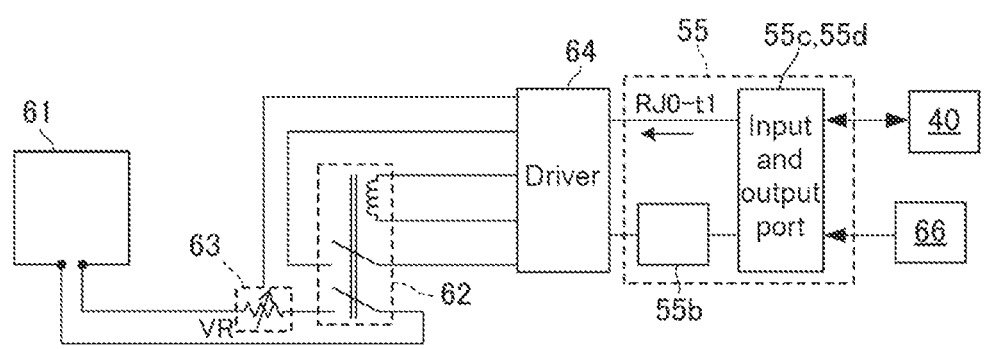
FIG. 4 is a schematic configuration diagram of the metal effect noise generator and an ON/OFF control circuit thereof in the article inspection verification system according to the embodiment of the present invention.

As illustrated in FIGS. 3A and 4, the magnetic field fluctuation generator 51 attached to the metal detection device 2 can switch ON/OFF of a loop coil 61 that affects the inspection section Z1 or the vicinity thereof by the metal detection device 2 by a relay circuit 62 via a driver 64 in accordance with a predetermined control signal RJ0-t1 from the PLC 55 that is a physical effect control unit, and can adjust a variable resistor 63 for impedance adjustment. As a result, as illustrated in FIG. 3B, the magnetic field fluctuation generator 51 can disturb the magnetic field formed by a transmission coil of the metal detection device 2 to a state close to that when a metallic foreign matter, for example, a sample (test piece) of the metallic foreign matter is contained into the article P, and cause level fluctuation of the detection signal. In addition, FIG. 3B illustrates detected waveforms when magnetic field fluctuations corresponding to two types of metal balls are generated as pulse-shaped noise signals at different timings. Further, a detection signal is taken into the PLC 55 from the article detection sensor 66 near the upstream end as the entrance of the inspection section Z1 of the metal detection device 2.

The loop coil 61 is made of, for example, a one-turn magnet wire (copper wire) and is formed in a planar shape. By fixing a coil case in which the loop coil 61 is fixed and enclosed by fasteners (not illustrated), the loop coil 61 can be stably and easily attached to the vicinity of the inspection section Z1 of the metal detection device 2. The loop coil 61 may have the number of turns, multistage switching of the number of turns, or switching among a plurality of types of coils (61, 61, and the like (not illustrated)) having different loop diameters.

A separate component box containing the variable resistor 63, the relay circuit 62 and the driver 64 is connected to the coil case in which the loop coil 61 is enclosed, with a flexible cable, and thus the degree of freedom of the installation location of the loop coil 61 is secured.

Also, the case in which the loop coil 61 is enclosed is preferably made of non-magnetic resin. In order to improve the environmental resistance so as to withstand the cleaning and washing of the manufacturing line, the case can also be formed of a metal plate of stainless steel exhibiting weak magnetism or the like.

By adopting such a form, as illustrated in FIG. 3A, the loop coil 61 can be installed near the detection unit (inspection section) in the metal detection device 2 already existing. A separate box containing the relay circuit 62, the variable resistor 63, and the driver 64 can be installed on the leg of the metal detection device 2. Thus, it is easy to install the article detection sensor 66 near the conveyor 11.

Further, ON/OFF of a predetermined control signal RJ0-t1, an operation holding/cancellation command for switching the relay circuit 62 by the driver 64 in accordance with the type of the article P as the inspection target, and a circuit program such as a register that defines the resistance value of the variable resistor 63 are stored in a portion of the memory unit 55b in the PLC 55.

Here, the variable resistor 63 is configured by a plurality of resistors that enable ON/OFF control by an electric signal. The variable resistor 63 may determine the impedance of the loop coil in accordance with a combination of resistors constituting the circuit, and set the DC (direct current) impedance when the relay circuit 62 is turned ON, and a closed circuit is formed together with the loop coil 61. The DC impedance of the loop coil 61 is correlated with the strength of the magnetic field fluctuation effect acting on the metal detection device 2, that is, the level of the detection signal, and a verification function equivalent to operation verification is realized by variously changing the size of a sample (test piece) of the metallic foreign matter.

In described above, the physical effect generator 51 for the metal detection device 2 can be configured to be unitized as the magnetic field fluctuation generator 51 by the loop coil 61 and the relay circuit 62 that opens and closes the loop coil 61. By setting the impedance of the loop coil 61, the effect level can be adjusted.

Furthermore, the magnetic field fluctuation generator 51 exhibits an electromagnetic action on the metal detection device 2 and has no moving portions in appearance. Thus, a monitor circuit that monitors the state of the relay circuit 62 may be provided, and the reliability may be improved by detecting an unintended disconnection or the like.

FIG. 3B illustrates a time chart showing the relationship between the detection waveform of the passing article P detected by the metal detection device 2 and the operation of the magnetic field fluctuation generator 51 in response to the article detection by the article detection sensor 66.

The metal detection device 2 determines that there is metal when the level of the detected waveform exceeds the determination limit.

Thus, the article inspection verification system 5 needs to operate the magnetic field fluctuation generator 51 while the article P is passing through the inspection section Z1 of the metal detection device 2, so as to determine that the article P contains metal.

Next, regarding the verification operation of the article inspection verification system 5, the operation for using the article P carried into the metal detection device 2 as the verification target article, and determining that the article P contains metal will be described.

The PLC 55 operates the magnetic field fluctuation generator 51 such that the metal detection device 2 determines that the article P contains metal when the article detection sensor 66 detects that the article P has been carried in.

As illustrated in FIG. 3B, the article detection sensor 66 switches the detection signal from an H level to an L level when detecting the article P approaching the inspection section Z1. The same applies to other article detection sensors 75 and 83 (84).

In the PLC 55, when the article detection sensor 66 detects that the article P has approached the inspection section Z1, two first and second timers (not illustrated) incorporated in the PLC 55 are activated, and the resistance value of the variable resistor 63 is set in the magnetic field fluctuation generator 51. When the first timer ends at a set time (TD1 or TD1' in FIG. 3B), a control signal is output, the relay circuit 62 is turned ON to form a closed circuit by the loop coil 61. When the second timer ends at a set time (TD2 in FIG. 3B), the relay circuit 62 is turned OFF, and a pulse-shaped noise signal is generated. Here, the set time (TD1 or TD1') of the first timer and the set time (TD2) of the second timer are set to timings at which the pulse-shaped noise signal described above is superimposed on the detection signal output by the metal detection device 2 while the article P is passing through.

The metal detection device 2 outputs a detection signal corresponding to the magnetic field fluctuation caused by the influence of moisture, salt content, and the like even for an article P that does not contain metal. Since the level of the detection signal is affected by the material, the temperature, the shape, the packaging material, and the like of the article P and does not reach a predetermined level, it is preferable to set a plurality of generation timings (TD1, TD1', and the like) for magnetic field fluctuation (pulse-shaped noise signal) caused by the magnetic field fluctuation generator 51 such that the relative position in the detection signal to the article P changes. By sequentially switching and applying the plurality of generation timings, it is preferable to handle as if the change in position at which a metal piece is attached on the article P.

As illustrated in FIGS. 5A to 7, the weighing device 3 includes a weighing scale 71, a weighing stand 72 interposed between the weighing scale 71 and the conveyor 12, and a mass calculation circuit (not illustrated) that calculates the mass of an article from the load obtained by subtracting the weight of the conveyor 12 and the weighing stand 72 from the load applied to the weighing scale 71, based on the output signal of the weighing scale 71.

Figure 6A:
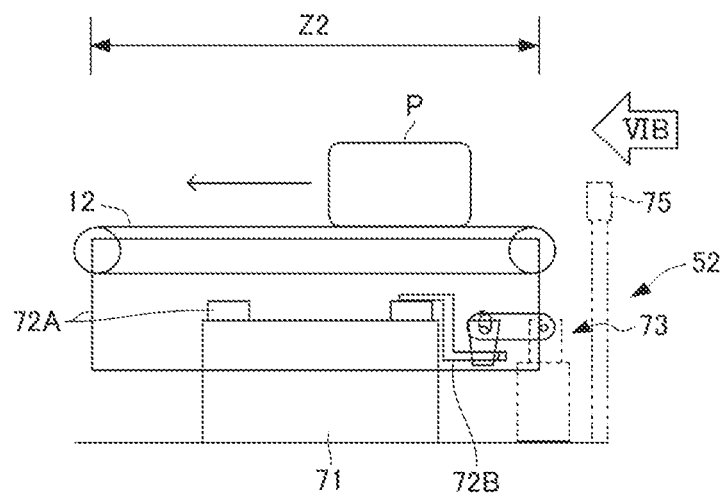
FIG. 6A is a front view schematically illustrating a configuration of a weight position controller for loading/unloading a weight in the article inspection verification system according to the embodiment of the present invention.
Figure 6B:
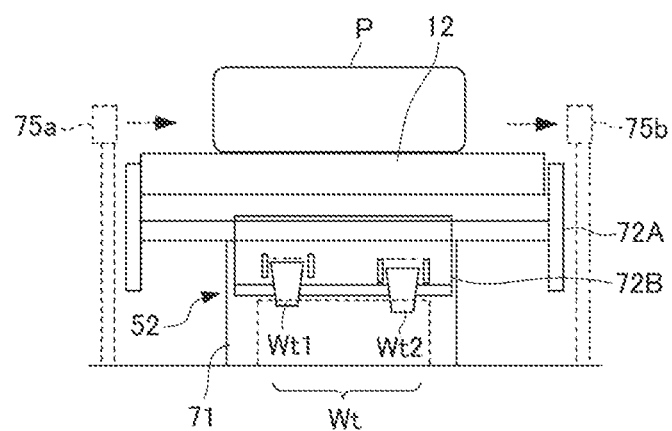
FIG. 6B is an arrow view in a VIB direction in FIG. 6A.

As illustrated in FIGS. 6A and 6B, the weighing stand 72 is configured by a conveyor frame 72A that directly supports the conveyor 12 and a weight holding table 72B. The weight holding table 72B is attached to a portion of the conveyor frame 72A with fasteners (not illustrated). The load of a weight Wt (Wt1, Wt2) placed on the weight holding table 72B is caused to act on the weighing scale 71 together with the load of the article P on the conveyor 12 through the conveyor frame 72A.

The weight holding table 72B is a space under the conveyor 12 and a region having a side portion surrounded by the conveyor frame 72A. The weight holding table 72B is disposed outside the weighing scale 71, and can be attached to the weighing device 3 already provided, without the large change in structure.

The weight holding table 72B is provided with two weight placement holes on the same surface, and conical weights Wt1 and Wt2 are stably held in contact with the tapered surfaces.

In addition, the weight position controller 52 attached to the weighing device 3 includes a loading/unloading mechanism 73, a photoelectric sensor 75 for article detection, and a drive circuit. The loading/unloading mechanism 73 operates two different weight loads or three different weight loads to be loaded on or unloaded from the weighing stand 72 by raising or lowering one or both of the two weights Wt1 and Wt2 having the same mass. The photoelectric sensor 75 for article detection includes a light projection portion 75a and a light reception portion 75b with the conveyor 12 interposed therebetween. The drive circuit operates the loading/unloading mechanism 73 in accordance with the detection signal of the photoelectric sensor 75. As a driving method of the loading/unloading mechanism 73 and a specific weight operation mechanism, types as follows are considered: a type that is a screw mechanism fixed to a motor shaft and raises and lowers a lifting member with a weight hook, a type in which a cam is driven by a motor to drive a weight lifting lever up and down, a type using another actuator, and the like. Such a driving method and operation mechanism are not particularly limited. The above loading/unloading mechanism can be configured similar to a loading/unloading mechanism and loading/unloading mechanism control means disclosed in Patent Document 4, for example. In either configuration, a gap is provided so that the weight with a load applied to the weighing stand 72 does not come into contact with a portion of the loading/unloading mechanism.

By driving the loading/unloading mechanism 73 through a drive circuit in accordance with a predetermined control signal RJ0-t4/t5 from the PLC 55 that is the physical effect control unit, the loading/unloading mechanism 73 of the weight position controller 52 changes a load applied to the weighing scale 71 through the weighing stand 72 to be increased or decreased. Thus, it is possible to switch the state to any one of three different weighing states illustrated in FIGS. 7A, 7B, and 7C.

Figure 7A:
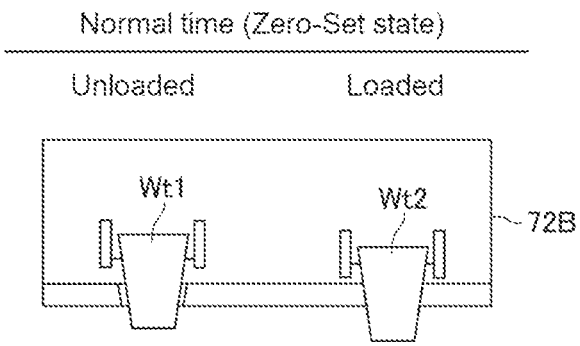
Figure 7B:
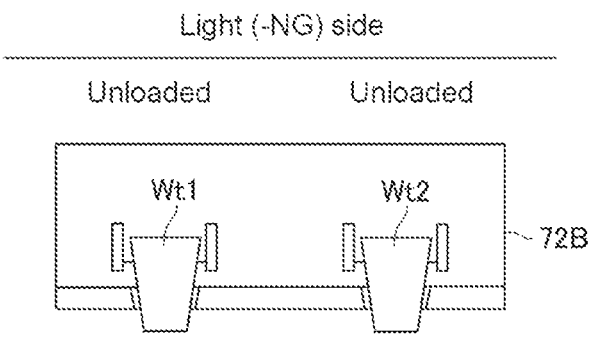
Figure 7C:
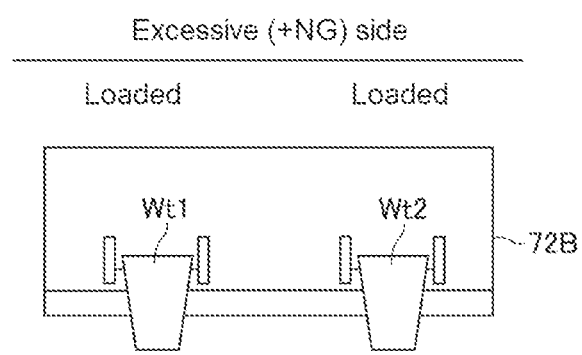

Specifically, the three different weighing states includes a normal zero-set state where the weight of one of the two weights Wt1 and Wt2, for example, only the weight Wt2 is applied to the weighing scale 71 through the weighing stand 72 as illustrated in FIG. 7A, a −NG side state, that is, a light side state where none of the two weights Wt1 and Wt2 is applied to the weighing scale 71 through the weighing stand 72 as illustrated in FIG. 7B, and a +NG side state, that is, an excessive side state where both of the two weights Wt1 and Wt2 are applied to the weighing scale 71 through the weighing stand 72 as illustrated in FIG. 7C.

Figure 5A:
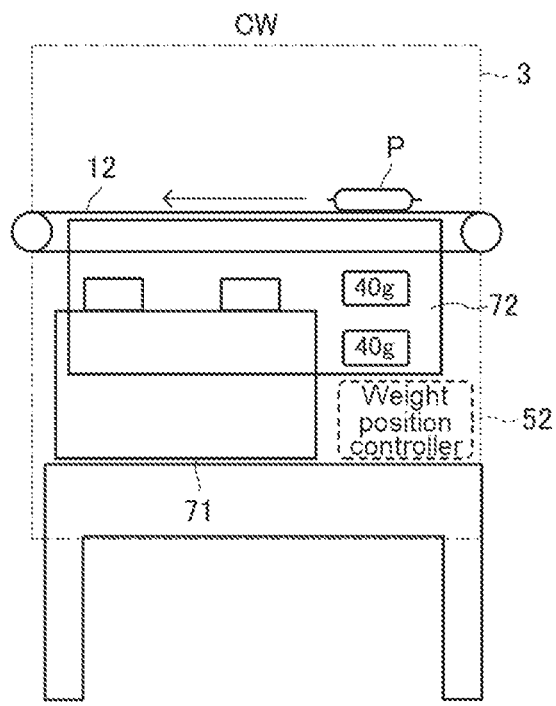
FIG. 5A is a schematic diagram of a weight position controller for a weighed value effect in the article inspection verification system according to the embodiment of the present invention.
Figure 5B:
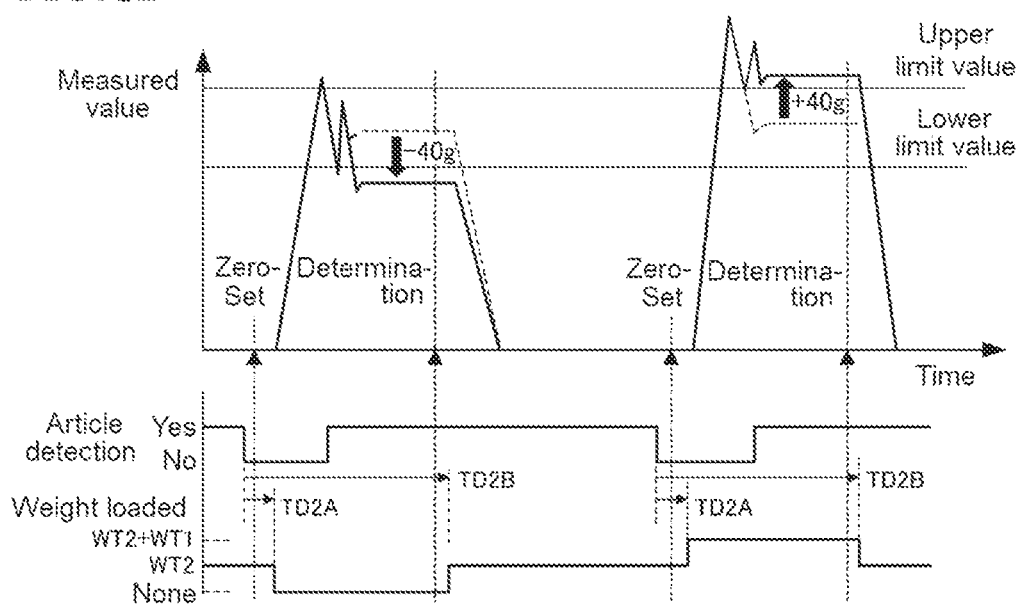
FIG. 5B is a graph showing a measured value due to a weight effect of the conveyed article detected by a weighing device in the article inspection system and measured value fluctuation due to the weight effect of a weight loaded on or unloaded from a weighing stand of the weighing device, together with a recording example of a check item, in which a vertical axis of the graph indicates the measured value of the weighing device, and a horizontal axis indicates time.

FIG. 5B illustrates a time chart showing the relationship between weighing of the article P in the weighing device 3 and the operation of the weight position controller 52 in response to the article detection by the photoelectric sensor 75.

First, regarding the weighing operation of the weighing device 3, the portions related to the verification operation of the article inspection verification system 5 will be briefly described.

When the weighing device 3 detects that the article P has approached the conveyor 12, the weighing device 3 zero-sets the weighing scale 71 at this time. The weighing device 3 acquires a weighed value after a predetermined time has elapsed from transfer of the article P onto the conveyor 12, and determines whether the weighed value is within a reference range formed by an upper limit value and a lower limit value. At this time, when the weighed value is greater than the upper limit value, the weighing device 3 performs determination to be excessive (+NG). When the weighed value is smaller than the lower limit value, the weighing device 3 performs determination to be light (−NG).

Next, regarding the verification operation of the article inspection verification system 5, the operation for using the article P carried into the weighing device 3 as the verification target article and determining the article P to be light (−NG) or excessive (+NG) will be described.

First, the case of causing the weighing device 3 to determine to be light (−NG) will be described.

When the article detection sensor 75 detects carrying-in of the article P, the PLC 55 controls the weight position controller 52 to cause load fluctuation to act on the weighing scale 71 so that the weighing device 3 determines the article P to be light (−NG).

As illustrated in FIG. 5B, when the article detection sensor 75 detects that the article P has approached the inspection section Z2, two third and fourth timers (not illustrated) incorporated in the PLC 55 are activated. When the third timer ends at a set time (TD2A in FIG. 5B), a control signal is output to the weight position controller 52, the weight Wt2 placed on the weight holding table 72B is retreated and held to the upper position, and a light weight state is caused. Here, the set time (TD2A) of the third timer is a delay time for operating the weight position controller 52 after zero-setting of the weighing scale 71. The operation time required for an operation of loading or unloading the weight is added. In addition, the operation of the weight Wt2 is completed before the weighing device 3 obtains the weighed value for determination on the article P.

In the light weight state, the weighing device 3 outputs a light weight (−NG) determination on the article P.

When the fourth timer ends at a set time (TD2B in FIG. 5B), the PLC 55 outputs a control signal to the weight position controller 52 to lower the weight Wt2 that has been retreated to the upper position, to a lower position, and then causes the weight Wt2 to be placed on the weight holding table 72 again. The set time (TD2B) of the fourth timer is a delay time for operating the weight position controller 52 after the weighing device 3 obtains the weighed value for determination. The operation of the weight Wt2 is completed before the next article P is carried in.

Next, the case of causing the weighing device 3 to determine to be excessive (+NG) will be described.

When the article detection sensor 75 detects carrying-in of the article P, the PLC 55 controls the weight position controller 52 to cause load fluctuation to act on the weighing scale 71 so that the weighing device 3 determines the article P to be excessive (+NG).

As illustrated in FIG. 5B, when the article detection sensor 75 detects that the article P has approached the inspection section Z2, two third and fourth timers (not illustrated) incorporated in the PLC 55 are activated. When the third timer ends at a set time (TD2A), a control signal is output to the weight position controller 52, the weight Wt1 retreated to the upper position is lowered to the lower position and placed on the weight holding table 72B, and an excessive weight state is caused. Here, the set time (TD2A) of the third timer is a delay time for operating the weight position controller 52 after zero-setting of the weighing scale 71. The time required for an operation of loading or unloading the weight is added. In addition, the operation of the weight Wt1 is completed before the weighing device 3 obtains the weighed value for determination on the article P.

In the excessive weight state, the weighing device 3 outputs an excessive weight (+NG) determination on the article P.

When the fourth timer ends at the set time (TD2B), the PLC 55 outputs a control signal to the weight position controller 52 to retreat the weight Wt1 placed on the weight holding table 72B to the upper position again. The set time (TD2B) of the fourth timer is a delay time for operating the weight position controller 52 after the weighing device 3 obtains the weighed value for determination. The operation of the weight Wt1 is completed before the next article P is carried in.

The two weights Wt1 and Wt2 do not necessarily have the same mass, and each may have any mass such that the two weights Wt1 and Wt2 make the states on the light weight side and the excessive weight side within a weighable range of the weighing scale 71.

For example, since the masses of the weights Wt1 and Wt2 operated by the weight position controller 52 becomes the effect level of the load fluctuation action on the weighing scale 71 through the weighing stand 72 by loading or unloading each weight, each of the two weights could be set to have a weight value so that the weighed value of the article P is determined to be excessive (+NG) or light (−NG) in accordance with the loading/unloading operation of each weight.

Specifically, when the effective weighing range of the weighing scale 71 is 20 to 500 g, the assumed mass distribution of the plurality of articles P that are sequentially put in is 280 g to 310 g, and the reference upper limit and the reference lower limit are 310 g and 290 g, respectively, the minimum mass of the weight to generate an excessive weight (+NG) for an article P of 280 g by the article inspection verification system 5 is 30 g. Similarly, the minimum mass of the weight to generate a light weight (−NG) for an article P of 310 g is 20 g. In practice, there are weighing errors of the weighing scale 71 and mass fluctuation that exceeds the assumed range of the article P. Therefore, in this example, weights of approximately 35 g to 40 g and 25 g to 30 g may be used, respectively. When the weight is set to 35 g to 40 g of the same mass, it is possible to reliably generate an excessive weight (+NG) and a light weight (−NG) for any article P within the effective weighing range of the weighing scale 71 without using an unnecessarily heavy weight and regardless which one of the two weights to be loaded or unloaded.

As described above, it is preferable to set the masses (40 g) of the weights Wt1 and Wt2 exemplified in the present embodiment in consideration of a combination of the effective weighing range of the weighing scale 71, the mass distribution of the article P, the upper limit value and the lower limit value as the reference for the excessive weight (+NG) and the light weight (−NG), which are set in the weighing device 3, the weighing performance of the weighing device 3, and the like.

Figure 8A:
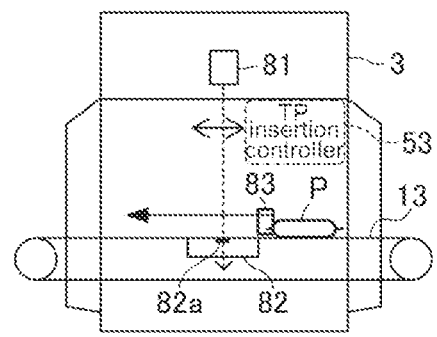
FIG. 8A is a diagram of an operation direction of a test piece insertion controller attached to an X-ray inspection device in the article inspection verification system according to the embodiment of the present invention.
Figure 8B:
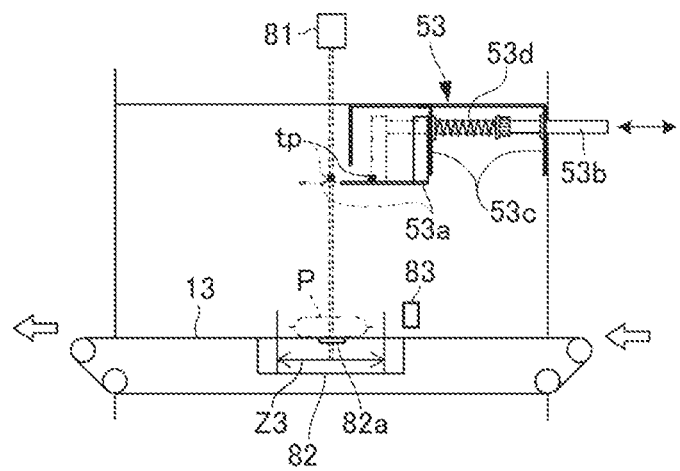
FIG. 8B is a front view of a main part in which an insertion time of the test piece insertion controller that inserts and extracts a test piece on an inspection line where an X-ray amount is detected for each predetermined time by the X-ray inspection device in the article inspection system is indicated by a virtual line, and an extraction time is indicated by a solid line.

As illustrated in FIGS. 8A and 8B, the X-ray inspection device 4 includes an X-ray irradiation unit 81 including an X-ray tube or the like and an X-ray detection unit 82 including an X-ray line sensor 82a that extends in a direction perpendicular to an article conveyance direction. In addition, although not illustrated, the X-ray inspection device 4 further includes an image generation unit and a foreign matter detection unit. The image generation unit generates data of an X-ray transmission image based on X-ray transmission data of the X-ray detection unit 82 for each predetermined time during an inspection period in which the article P passes on the X-ray line sensor 82a of the X-ray detection unit 82. The foreign matter detection unit specifies a part at which the transmission amount changes rapidly in the X-ray transmission image, and detects foreign matters.

An inspection space ZX is formed in the X-ray inspection device 4 as a region for irradiating the article P with X-rays, and X-ray leakage to the outside is prevented by covering the inspection space ZX with a metal housing, a shield, and the like. As the shield, a shielding curtain 85 may be hung in the inspection space ZX, or a tunnel-like shielding cover (not illustrated) may be installed before and after the inspection space ZX. The shield is selected in accordance with the shape of the article P and conveyance characteristics.

The test piece insertion controller 53 is provided in the upper portion of the inspection space ZX of the X-ray inspection device 4, and a test piece tp is moved to a position of blocking X-rays emitted from the X-ray irradiation unit 81 to the X-ray detection unit 82.

The test piece insertion controller 53 attached to the X-ray inspection device 4 includes a test piece stand 53a, a foreign matter test piece tp supported on the test piece stand 53a, a linear motion guide rod 53b joined to the test piece stand 53a, a compression spring 53d, and an insertion drive mechanism and a drive circuit (not illustrated). The test piece stand 53a can pass over the X-ray line sensor 82a of the X-ray detection unit 82 at a moving speed equivalent to the conveyance speed of the article P by the conveyor 13 on the article conveyance path 10. The bracket 53c supports the linear motion guide rod 53b to be movable parallel to the article conveyance direction. The compression spring 53d biases the linear motion guide rod 53b with respect to the bracket 53c to the left side in FIGS. 8A to 8C being the opposite direction of the article conveyance direction and biases the test piece tp on the test piece stand 53a to be moved away from an irradiation X-ray region from the X-ray irradiation unit 81. The insertion drive mechanism moves the test piece stand 53a against a biasing force of the compression spring 53d in the article conveyance direction to insert the test piece tp into the irradiation X-ray region.

The insertion drive mechanism referred to here is configured by a motor and a linear/rotational motion conversion mechanism, for example. In such an insertion drive mechanism, rotational drive of the motor through the drive circuit and switching of the rotation direction are performed in accordance with the predetermined control signal RJ0-t2 from the PLC 55. Thus, the test piece insertion controller 53 inserts the foreign matter test piece tp into the irradiation X-ray region at a timing that matches the article inspection period.

The test piece stand 53a may support, as the test piece tp, a reference sample defined by a user as a quality control reference for the article P, or may support a plurality of foreign matter test pieces (tp, tp, . . . ) having different materials and shapes.

Figure 8C:
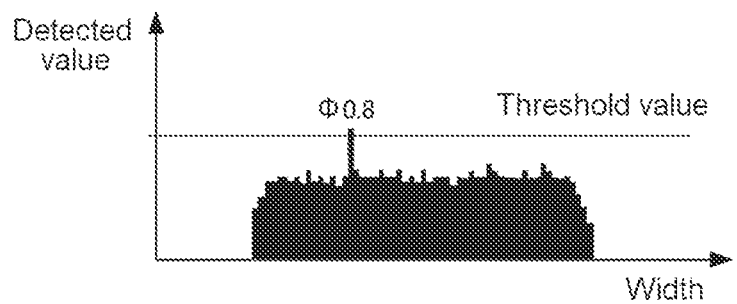
FIG. 8C is a graph showing distribution of detected values of the X-ray amount (value corresponding to an attenuated amount due to the article effect) detected by a plurality of detection elements on the inspection line for each predetermined time in an article inspection period in the X-ray inspection device, by using a predetermined time when an inspection NG occurs, as an example, in which a vertical axis indicates the detected value, and a horizontal axis indicates a position of an article in a width direction being an inspection line direction.
Figure 9A:
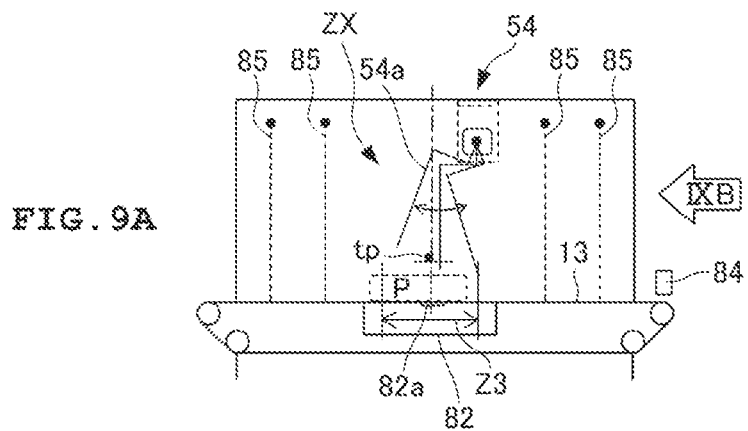
FIG. 9A is a diagram of an operation direction of a test piece insertion controller attached to an X-ray inspection device in an article inspection verification system according to another embodiment of the present invention.
Figure 9B:
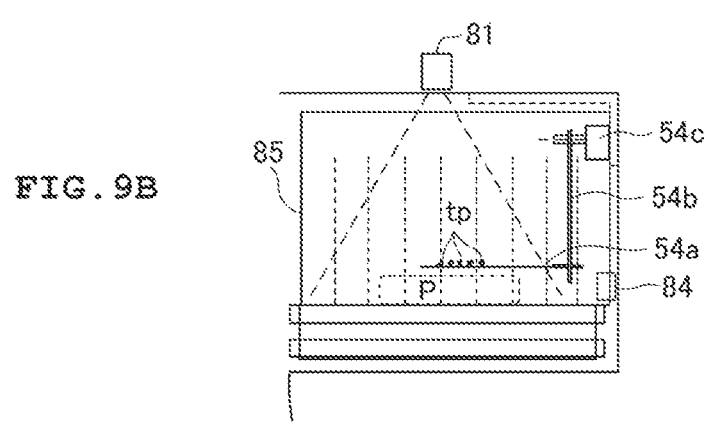
FIG. 9B is an arrow view in an IXB direction of FIG. 9A, which illustrates an arrangement example of a plurality of test pieces simultaneously inserted and extracted on the inspection line by the test piece insertion controller.
Figure 9C:
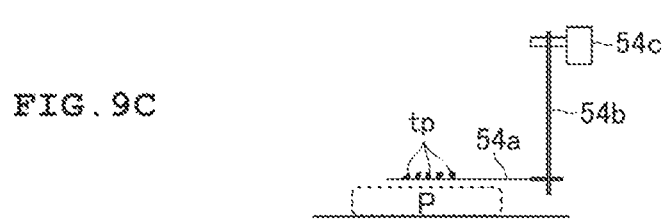
FIG. 9C illustrates an arrangement height of the test pieces in a case where a thickness of a conveyed article in an X-ray transmission direction is relatively small.
Figure 9D:
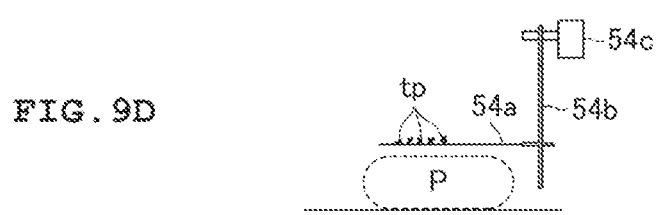
FIG. 9D illustrates an arrangement height of the test pieces in a case where the thickness of the conveyed article in the X-ray transmission direction is relatively large.
Figure 11:
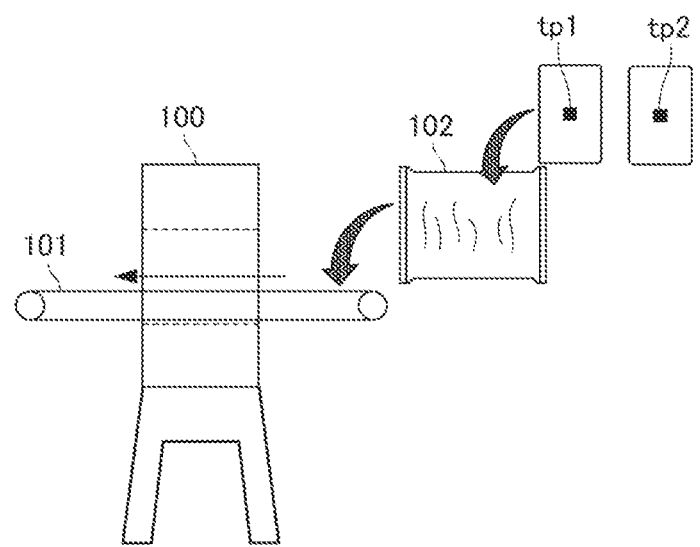
FIG. 11 is a diagram of an example of a verification method for verifying a defect detection function of an article inspection device such as a conventional metal detection device by attaching a test piece on an article.

FIG. 8C illustrates the detected values (attenuation equivalent values) of an X-ray amount detected by the X-ray detection unit 82 in a state where the article P is conveyed to pass over the X-ray line sensor 82a of the X-ray detection unit 82, and the foreign matter test piece tp is inserted into the irradiation X-ray region. FIG. 8C illustrates the detected values as a distribution diagram in the width direction that is a detection element arrangement direction of the X-ray line sensor 82a.

The management PC 40 is configured by an industrial PC or the like that is LAN-connected to the control units of the plurality of types of article inspection devices 2 to 4 and the PLC 55 in a predetermined wired or wireless bus manner. The management PC 40 has functions of overall setting in the article inspection system 1 and the article inspection verification system 5, recording of the operation history of both systems 1 and 5, creation and an output of a report in a predetermined format, and a display output of such setting, recording, a report, and the like to a screen 41.

The management PC 40 includes, for example, a CPU being a processor with a built-in cache, a RAM, a ROM, an input/output interface circuit, a storage device such as an SSD and an HDD, a plurality of control programs and various types of setting information (including control parameters) stored in the ROM and the storage device, and the like. The CPU executes the predetermined control program based on various types of sensor information, setting information, and the like, and thereby exhibiting the above-described functions and operating as a plurality of functional units as described next.

That is, the management PC 40 includes a verification information storage unit 42 that stores and retains verification information indicating whether or not the defect detection operation of each of the article inspection devices 2 to 4 is normal, to be able to be recorded and output, when any or all of the article inspection devices 2 to 4 determine the article P passing through the inspection sections Z1 to Z3 to be a defective product during a specific period during the operation of the article inspection system 1, for example, within a predetermined period at the start of the line described above, during the line operation, and at the end of the line (see FIG. 2).

However, the verification operations of the plurality of types of article inspection devices 2 to 4 in the article inspection verification system 5 are sequentially performed in accordance with the conveyance timing of the article P. Since the delay (latency) occurs in the direct control from the LAN-connected management PC 40, from a viewpoint of securing the certainty of the verification operation, it is preferable to perform reception of the detection signal from each of the article detection sensors 15, 66, 75, and 83 (84) requiring real-time performance, and transmission and reception of the control signal and the like to and from each of the physical effect generators 51, 52, and 53 (may be the physical effect generator 54 in FIGS. 9A to 9D), by using control commands by serial communication including a voltage level (high level/low level) of the signal and bus connection as the control unit that mainly includes the PLC 55 installed near each article inspection line.

The sorting device 20 includes a sorting and discharge drive circuit 25. The sorting and discharge drive circuit 25 enables the flipper type rejection mechanism 27 (27A or 27B) to perform a sorting and discharging operation in accordance with either of sorting commands RJ1 and RJ2 that are defect detection signals from the metal detection device 2 and the X-ray inspection device 4 that can detect foreign matters among the plurality of types of article inspection devices 2 to 4, and enables the flipper type rejection mechanism 28 (28A or 28B) to perform a sorting and discharging operation in accordance with either of sorting commands RJ4 and RJ5 that are defect detection signals from the weighing device 3 capable of detecting excess or deficiency of contents (+NG, −NG) among the plurality of types of article inspection devices 2 to 4.

When a sorting command RJ0 that is an article discharge signal for verification from the PLC 55 is input, the sorting and discharge drive circuit 25 enables the dropout type sorting conveyor 17 to perform the sorting and discharging operation in accordance with the sorting command RJ0.

Specifically, the dropout type sorting conveyor 17 and the flipper type rejection mechanisms 27 and 28 can perform the respective sorting and discharging operations in a manner that the linear motion outputs from air cylinders CYL1, CYL2, and CYL3 are converted into rotary motion by the corresponding linear/rotational motion conversion mechanisms Mc1, Mc2, and Mc3 such as ring-lever mechanisms.

Here, the dropout type sorting conveyor 17 is disposed on the downstream side of the conveyors 11, 12, and 13 (14) provided with the inspection sections Z1, Z2, and Z3 on the article conveyance path 10 and is disposed on the upstream side of the conveyors 18 and 19 provided with the rejection mechanisms 27 and 28 for discharging the article P determined to be the defective product in the direction away from the article conveyance path 10. The dropout type sorting conveyor 17 can lower the downstream side thereof until an inclined posture in the direction away from the article conveyance path 10, for example, the inclined posture indicated by the virtual line in FIG. 2 is obtained, and can be held at a posture at which the article P can be conveyed to the downstream side, for example, at a horizontal posture indicated by the solid line in FIG. 2.

More specifically, the flipper type rejection mechanisms 27 and 28 include pairs of flippers (27A and 27B, and 28A and 28B) disposed on both sides in the belt width direction of the conveyor 18 following the sorting conveyor 17, the air cylinders CYL2 and CYL3 corresponding to flippers, and the linear/rotational motion conversion mechanisms Mc2 and Mc3. The flipper type rejection mechanisms 27 and 28 can perform the predetermined sorting and discharging operation of supporting, for example, the base end portion of each flipper on the downstream side by a rotary shaft and entering the tip end portion thereof on the upstream side at a predetermined crossing angle on the conveyor 18. During a period in which either the sorting command RJ1 or RJ2 is input to the sorting and discharge drive circuit 25, the corresponding one of the pair of flippers of the flipper type rejection mechanism 27 performs the predetermined sorting and discharging operation. During a period in which either the sorting command RJ4 or RJ5 is input to the sorting and discharge drive circuit 25, the corresponding one of the pair of flippers of the flipper type rejection mechanism 28 performs the predetermined sorting and discharging operation.

Each of the air cylinders CYL1, CYL2, and CYL3 can supply compressed air (supply pressure indicated by the circle in FIG. 2) to a pressure chamber on one side of the expansion/contraction direction, while discharging residual air from a pressure chamber on the other side (indicated by x in FIG. 2), by the corresponding air feeding and discharge control valves V1, V2, or V3 connected to a pair of air feeding and discharge ports. With the switching control between the plurality of air feeding and discharge control valves V1, V2, and V3, the dropout type sorting conveyor 17 and the flipper type rejection mechanisms 27 and 28 can perform the sorting and discharging operation, and return from the operation position thereof to the normal operation position in accordance with ON/OFF of the sorting commands RJ0, RJ1, RJ2, RJ4, and RJ5, respectively.

The sorting and discharge drive circuit 25 can receive a plurality of sorting commands for a certain article P, and the sorting priority as to which sorting command the article P is to be discharged at this time is set in advance.

For example, in a case where a defect due to metal detection in the metal detection device 2 and a defect due to the light weight or excessive weight in the weighing device 3 together occur for a certain article P, the article P is set to be discharged as the defect due to the metal detection.

Furthermore, for example, in a case where a defect due to metal detection in the metal detection device 2 and a defect due to foreign matter detection in the X-ray inspection device 4 together occur for a certain article P, the article P is set to be discharged as the defect due to the foreign matter detection.

As described above, when a plurality of defects occur in a specific article P, the article P is rejected to a specific discharge destination based on the preset sorting priority.

The article inspection verification system 5 is for verifying the operation of the article inspection system 1, and, there is no sorting priority between the sorting command RJ0 being the article discharge signal for verification, and the other sorting commands RJ1, RJ2, RJ4, and RJ5.

As a result, in response to the defect determination caused by the article inspection verification system 5, the article P as the verification target article can be discharged from the non-defective product conveyance route 10 by the sorting conveyor 17, and the rejection mechanism can be operated based on the sorting command in response to the defect determination as if the article P is a normal defective product. As described above, in a case where the sorting conveyor 17 is not provided, the article P as the verification target article is rejected to any discharge destination based on the sorting command.

In the sorting device 20, a return conveyance mechanism that moves the article P as the verification target article discharged from the sorting conveyor 17 to the upstream side of the article conveyance path 10 is provided as the return conveyance conveyors 21 and 22.

The return conveyance conveyors 21 and 22 are disposed below the conveyors 16, 17, and 18 in the vertical direction in correspondence with the sorting and discharging operation posture of the sorting conveyor 17 here. By setting sorting and discharge directions from the article conveyance path 10 to be different, the return conveyance conveyors 21 and 22 can be disposed at any positions. The return conveyance conveyor 21 is a conveyor for receiving an article P, which is used as a pseudo-defective product for verification and is actually not inspected, from the sorting conveyor 17, and sending and delivering the article P to the return conveyance conveyor 22. The posture of the conveyor 21 may be an inclined posture suitable for the delivery, or may be changed. The return conveyance conveyor 22 can convey the article P to a product stock stand on the upstream side, a conveyor for accumulation, or the like (not illustrated).

A return article detection sensor 32 that detects an article P, which is used as the pseudo-defective product for verification and is not inspected, when this article P is discharged from the dropout type sorting conveyor 17 is provided on the return conveyance conveyor 21. When the article detection sensor 32 detects the article P discharged as the verification target article, the return conveyance conveyors 21 and 22 are driven in a return conveyance direction.

Further, the sorting and discharging operation of each flipper can be detected based on detection information of each of the operation detection sensors 33 and 34 that detect rotation of the rotation support shaft of each flipper in the flipper type rejection mechanisms 27 and 28. The non-defective product passage detection sensor 35 is disposed between the conveyor 18 on which the flipper type rejection mechanisms 27 and 28 are disposed and the conveyor 19 on the downstream side of the conveyor 18, and detects the passage of the article P to the subsequent stage.

As described above, in the present embodiment, the article inspection system 1 includes not only a first article inspection device 2 or 4 and a second article inspection device 3, which have a plurality of different inspection types as the article inspection devices 2, 3, and 4, but also the flipper type rejection mechanism 27 being a first defective product rejection mechanism that moves an article P of an NG product determined to be a defective product by the first article inspection device 2 or 4 in the direction away from the conveyors 16 to 19 as the non-defective product conveyance route on the article conveyance path 10, and the flipper type rejection mechanism 28 being a second defective product rejection mechanism that moves an article P of an NG product determined to be a defective product by the second article inspection device 3 in the direction away from the conveyors 16 to 19 as the non-defective product conveyance route on the article conveyance path 10, the first defective product rejection mechanism and the second defective product rejection mechanism being provided on the downstream side of the inspection sections Z1, Z2, and Z3 on the article conveyance path 10.

Here, the detection signal of the operation detection sensor 31 that detects the operation state of the dropout type sorting conveyor 17, and the detection signals output from the operation detection sensors 33 and 34 that detects the operation states of the flipper type rejection mechanisms 27 (27A and 27B) and 28 (28A and 28B) and the non-defective product passage detection sensor 35 are input to the PLC 55 constituting the article inspection verification system 5. In a case where all of the detection signals of the operation detection sensors 33 and 34 for the flipper type rejection mechanisms 27 and 28 and the detection signal of the non-defective product passage detection sensor are input to the article inspection system 1, the management PC 40 can verify the overall operation. Thus, it is not necessary to change a connection destination to input the detection signal to the PLC 55 or to branch the detection signal to be input even to the PLC 55. That is, it is possible to construct the article inspection verification system 5 without changing the functions of the existing article inspection system 1 and article inspection devices 2 to 4, or changing the connection destinations of various sensors.

Also, the plurality of types of article inspection devices in the article inspection system 1 include the metal detection device 2 that detects metal components in the article P, and the physical effect generator 51 in the article inspection verification system 5 includes the magnetic field fluctuation generator that changes the magnetic field in the inspection section in accordance with the control signal (RJ0-t1) requiring magnetic field fluctuation generation for verification from the physical effect control unit 55.

Further, the plurality of types of article inspection devices in the article inspection system 1 include the weighing device 3 that weighs an article P, and the physical effect generator 52 in the article inspection verification system 5 includes the loading/unloading mechanism 73 that adds and removes a weight load to and from the weight of an inspection object P in the inspection section Z2 in accordance with the control signal (RJ0-t4/t5) for weight load increase/decrease from the physical effect control unit 55.

In addition, the plurality of types of article inspection devices 2 to 4 in the article inspection system 1 include the X-ray detection device 4 that irradiates an article P passing in the inspection section Z3 on the article conveyance path 10 with X-rays and performs article inspection based on the transmitted X-ray amount distribution, and the physical effect generator 53 in the article inspection verification system 5 is configured as a test piece movement mechanism that inserts and retreats the test piece tp having predetermined X-ray transmission characteristic into and from the irradiation X-ray region over the X-ray line sensor 82a in the inspection section Z3 in accordance with the control signal (RJ0-t2) for test piece insertion require from the physical effect control unit 55.

Since the PLC 55 in the present embodiment executes the sequence control program rewritable by the programming tool in the order of the step numbers in the program list, the physical effect control unit that can variably set the output conditions of the control signal (RJ0-t1), (RJ0-t4/t5), (RJ0-t2)) to the physical effect generators 51, 52, and 53 in accordance with the product type of the article P.

Such an article inspection verification system 5 in the present embodiment is provided in the article inspection system 1 including the plurality of article inspection devices 2 to 4 that inspect the quality state of the article P passing through the inspection sections Z1, Z2, and Z3 on the article conveyance path 10, and determines whether the article is a non-defective product or a defective product, based on predetermined determination conditions. The article inspection verification system 5 includes the physical effect generators 51, 52, and 53 that generate a physical effect causing the article P in the inspection sections Z1 to Z3 to be determined to be a defective product, and the PLC 55 as the physical effect control unit that stores, in advance, the generation conditions of the physical effect by the physical effect generators 51, 52, and 53, and drives the physical effect generators 51, 52, and 53 during the operation of the article inspection system 1 in accordance with the generation conditions, and thereby causing the plurality of types of article inspection devices 2, 3, and 4 to determine the article P passing through the inspection sections Z1, Z2, and Z3 within the specific period during the operation to be a defective product.

In other words, under the control of the PLC 55, the physical effect generators 51, 52, and 53 each causes the physical effect to act on the corresponding one article inspection device among the article inspection devices 2 to 4, and causes the physical effect not to act on the other article inspection devices. Thus, it is possible to determine a specific article P to be defective in any combination of the plurality of types of article inspection devices 2 to 4.

Further, in such a configuration in the present embodiment, the article inspection system 1 includes not only the first article inspection devices 2 and 4 and the second article inspection device 3, which have a plurality of different inspection types, but also the rejection mechanism 27 as the first defective product rejection mechanism that moves an article P of an NG product determined to be a defective product by the first article inspection device 2 or 4 in the direction away from the conveyors 16 to 19 as the non-defective product conveyance route on the article conveyance path 10, and the rejection mechanism 28 as the second defective product rejection mechanism that moves an article P of an NG product determined to be a defective product by the second article inspection device 3 in the direction away from the conveyors 16 to 19 as the non-defective product conveyance route on the article conveyance path 10, the first defective product rejection mechanism and the second defective product rejection mechanism being provided on the downstream side of the inspection sections Z1, Z2, and Z3 on the article conveyance path 10.

Operation data generated in the PLC 55 by the article inspection verification system 5 will be described.

As illustrated in the columns of the article detection sensor and the magnetic field fluctuation generator in FIG. 10, when the article P is detected by the detection signal of the article detection sensor 66, and when the first timer ends and the relay circuit 62 that forms the loop coil 61 is turned ON for the time defined by the second timer, the PLC 55 generates operation data related to this. The operation data here may include, for example, a time point (time stamp), a device ID, an event code, a setting value, and the like.

In verification data generated by the PLC 55, time point information is added to an identification ID of the article detection sensor 66, an ID of the formed loop coil 61 or an ID of the ON-operated relay element, the resistance value of the variable resistor 63, the information of a register in which the resistance value is set, and the like. The verification data is recorded as a series of data together with header information for identifying the verification condition.

In a case where the relay circuit 62 includes a monitor circuit, monitor information indicating that the relay circuit 62 has operated is also recorded.

As illustrated in the columns of the weight position controller and the like in FIG. 10, the PLC 55 generates verification operation data when the article P is detected by the detection signal of the article detection sensor 75, and when the loading/unloading operation of the weight Wt1 is performed when each of the third and fourth timers ends.

In the verification operation data generated by the PLC 55, time point information is added to an identification ID of the article detection sensor 75, an ID of the loaded/unloaded weight Wt1 or an ID of the motor that has performed the loading/unloading operation, information indicating the direction in which the weight Wt1 is loaded/unloaded, and the like. The verification operation data is recorded as a series of data together with the header information for identifying the verification condition.

Further, as illustrated in the columns of the test piece insertion controller and the like in FIG. 10, when the article P is detected by the detection signal of the article detection sensor 83 (84), the PLC 55 generates operation data when the fifth timer ends, and the operation of inserting test piece stand 53a (54a) is performed.

In the verification operation data generated by the PLC 55, time point information is added to the identification ID of the article detection sensor 83 (84), the identification ID of the test piece insertion controller 53 (54) that performs an operation of inserting the test piece, and the like. The verification operation data is recorded as a series of data together with the header information for identifying the verification conditions.

The PLC 55 is programmed to output the data set of each verification operation to the management PC 40 communicatively connected, in a predetermined data communication procedure and a predetermined data format.

Next, the actions will be described.

In the present embodiment configured as described above, the physical effect generators 51, 52, and 53 are sequentially driven within the specific period during the operation of the article inspection system 1 by the verification control signals (RJ0-t1), (RJ0-t4/t5), and (RJ0-t2) from the PLC 55 being the physical effect control unit. Thus, the physical effect causing the article P passing through the inspection sections Z1, Z2, and Z3 to be determined to be a defective product is generated within the corresponding section in a form of magnetic field effect noise, increase or decrease in weight load, insertion of a test piece, or the like. Therefore, regardless of whether the article P passing through each of the inspection sections Z1, Z2, and Z3 is actually a non-defective product or a defective product, it is possible to generate a pseudo-defective product under the control of the article inspection verification system 5 during the operation of the article inspection system 1. In addition, it is possible to verify whether or not the defect detection operation of the article inspection device on the article P made to be a defective product at this time is normal.

Further, in the present embodiment, when the article P passing through the inspection sections Z1, Z2, and Z3 within the specific period during the operation of the article inspection system 1 is determined to be a defective product, the verification information indicating whether the defect detection operation of each of the article inspection devices 2, 3, and 4 is normal is stored and retained in the verification information storage unit 42 to be able to be recorded and output. Therefore, the verification work of periodically checking the defect detection operation of each of the article inspection devices 2, 3, and 4 and recording the results is greatly facilitated.

Furthermore, in the present embodiment, the flipper type rejection mechanisms 27 and 28 are disposed on the downstream side of the inspection sections Z1 to Z3 on the article conveyance path 10. In addition, the return conveyance conveyors 21 and 22 that moves the article P of an NG product determined to be a defective product when passing through the inspection sections Z1 to Z3 to the upstream side of the article conveyance path 10 while bypassing the inspection sections Z1 to Z3 are provided between defective product rejection section Zrj1/2 and Zrj4/5 by the rejection mechanisms 27 and 28 for defective product rejection and the inspection sections Z1 and Z3 on the upstream side. Therefore, it is possible to return the article P that is made to be a pseudo-defective product and of which a normal inspection result is not obtained, to the upstream side of the article conveyance path 10 while bypassing the inspection sections Z1 to Z3, between the inspection sections Z1 to Z3 of the article inspection system 1 and the defective product rejection section Zrj1/2 and Zrj4/5 by the defective product rejection mechanisms 27 and 28 on the downstream side of the inspection sections Z1 to Z3. Thus, it is possible to perform the normal inspection again, for example.

In addition, in the present embodiment, the article inspection system 1 includes not only the first article inspection device 2 or 4 and the second article inspection device 3 having a plurality of different inspection types, and but also includes the first rejection mechanism 27 for defective product rejection, that moves the article P determined to be a defective product by the first article inspection device 2 or 4 in the direction away from the conveyors 16 to 19 serving as the non-defective product conveyance route on the article conveyance path 10, and the second rejection mechanism 28 for defective product rejection, that moves the article P determined to be a defective product by the second article inspection device 3 in the direction away from the conveyors 16 to 19, the first rejection mechanism 27 and the second rejection mechanism 28 being provided on the downstream side of the inspection sections Z1 to Z3 on the article conveyance path 10. Therefore, by providing the plurality of types of physical effect generators 51 and 52 corresponding to the inspection types of the first and second article inspection devices 2 and 3, it is possible to continuously perform a plurality of types of article inspection and rejection functions for the same article P in the same article inspection system 1.

Furthermore, in the present embodiment, when the article inspection system 1 includes the plurality of article inspection devices 2 to 4 having a plurality of different inspection types, the physical effect control unit 55 in the article inspection verification system 5 can be configured to drive the physical effect generator corresponding to one or both of the first article inspection device and the second article inspection device for a specific inspection target article. Therefore, when the article inspection line includes the first article inspection device and the second article inspection device having a plurality of different inspection types, it is possible to verify an overall operation of an article inspection system 1 when any one or both article inspection devices detect a defect, by exhaustive combinations.

Further, in the present embodiment, the operation detection sensor that detects the operation states of the first defective product rejection mechanism and the second defective product rejection mechanism can be further provided. Therefore, it is possible to detect the operation state of the rejection mechanism in the sorting device 20 in the subsequent stage for the article P determined to be defective by any one or a plurality of article inspection devices among the plurality of types of article inspection devices 2 to 4, and to verify whether the article P is rejected to the correct discharge destination.

In addition, the article inspection system 1 in the present embodiment includes the metal detection device 2 that detects the metal component in the article P as the article inspection device, and the physical effect generator 51 attached to the metal detection device 2 generates magnetic field fluctuation that changes a magnetic field in the inspection section Z1, in accordance with the control signal RJ0-t1 from the PLC 55. Therefore, without affecting the article P passing through the inspection section Z1, it is possible to cause the metal detection device 2 to automatically generate a pseudo-defective product during the operation of the article inspection system 1, and to easily and accurately verify whether the defect detection operation of the metal detection device 2 on the article P made to be a defective product at this time is normal.

Furthermore, in the present embodiment, the physical effect generator 52 attached to the weighing device 3 as the article inspection device includes the loading/unloading mechanism 73 that adds or removes a weight load to the weighing scale 71 from the weighing stand 72 for the weight of the article P in the inspection section Z2 in accordance with the control signal from the PLC 55. Therefore, by adding or removing a load that affects the weighed value, without affecting the article P that passes through the inspection section Z2, it is possible to cause the weighing device 3 to automatically generate a pseudo-defective product during the operation of the article inspection system 1, and to easily and accurately verify whether the defect detection operation of the weighing device 3 for the article P made to be a defective product at this time is normal.

In the present embodiment, as the article inspection device, the X-ray inspection device 4 that irradiates the article P passing in the inspection section Z3 on the article conveyance path 10 with X-rays and performs article inspection based on the detected value distribution of the transmitted X-ray amount, and the physical effect generator 53 attached to the X-ray inspection device 4 constitutes the test piece movement mechanism that enters and retreats the test piece tp having predetermined X-ray transmission characteristic in accordance with the control signal RJ0-t2 from the PLC 55. Therefore, by taking the test piece tp into and out of the inspection section Z3, which affects the X-ray inspection, without affecting the article P that passes through the inspection section Z3, it is possible to cause the X-ray inspection device 4 to automatically generate a pseudo-defective product during the operation of the article inspection system 1 and to verify whether or not the defect detection operation of the X-ray inspection device 4 for the article P made to be a defective product at this time is normal.

Further, in the present embodiment, the PLC 55 which is the physical effect control unit variably sets the output conditions of the control signals (RJ0-t1), (RJ0-t4/t5), and (RJ0-t2) for the physical effect generators 51, 52, and 53 in accordance with the product type of the article P. Thus, it is possible to generate a physical effect accurate for the product type in the inspection sections Z1, Z2, and Z3, and to perform the verification work effective for the article inspection.

As described above, according to the present embodiment, without affecting the article P passing through the inspection sections Z1 to Z3, it is possible to cause each of the article inspection devices 2, 3, and 4 to automatically generate a pseudo-defective product during the operation of the article inspection system 1 and to verify whether or not the defect detection operation of the article inspection devices 2, 3, and 4 is normal. In addition, it is possible to provide an article inspection verification system capable of preventing a reduction in operating rate of the article inspection system 1 associated with the verification work and greatly reduces a work burden of the verification work.

Other Embodiments

FIGS. 9A to 9D illustrate an article inspection verification system according to another embodiment of the present invention.

As illustrated in FIGS. 9A to 9D, the present embodiment is similar to the above-described embodiment in that an article inspection verification system 5 capable of periodically verifying whether or not the defect detection function of the article inspection system 1 is normal under the operation state of the article inspection system 1.

In addition, the present embodiment is similar to the above-described embodiment in that the article inspection verification system 5 includes a magnetic field fluctuation generator 51 for an inspection magnetic field, which is attached to a metal detection device 2 and a weight position controller 52 attached to a weighing device 3, as a plurality of types of physical effect generators that generate a physical effect causing an article P to be determined to be a defective product, in each of a plurality of inspection sections Z1 and Z2.

However, the article inspection verification system 5 in the present embodiment is different from that in the above-described embodiment, that includes the linear motion type test piece insertion controller 53, in that the article inspection verification system 5 includes a swing type test piece insertion controller 54 attached to an X-ray inspection device 4, as a plurality of types of physical effect generators that generate a physical effect causing the article P to be determined to be a defective product, in another inspection section Z3.

The test piece insertion controller 54 in the present embodiment, which is attached to the X-ray inspection device 4, includes a test piece stand 54a, a foreign matter test piece tp supported on the test piece stand 54a, a swing rod 54b, a motor 54c, and an insertion drive mechanism and a drive circuit (not illustrated). The test piece stand 54a can pass over an X-ray line sensor 82a of an X-ray detection unit 82 at the movement speed equivalent to the conveyance speed of the article P by the conveyor 13 of the article conveyance path 10. The swing rod 54b is joined to the test piece stand 54a and integrally supported at the upper end with respect to the main shaft of the above-described motor 54c. The motor 54c can swing the swing rod 54b in a direction parallel to the article conveyance direction. The insertion drive mechanism moves the test piece stand 54a in a direction substantially parallel to the article conveyance direction and selectively inserts the test piece tp into the irradiation X-ray region over the X-ray line sensor 82a of the X-ray detection unit 82.

There are more restrictions than the embodiment illustrated in FIGS. 8A to 8C in that a curtain-shaped shielding member is hung in the inspection space ZX of the X-ray inspection device 4 illustrated in FIGS. 9A to 9D, and a space in which the test piece insertion controller 54 can be disposed is limited to being inside the curtain-shaped shielding member. However, because of a configuration in which the test piece stand 54a is joined to the swing rod 54b, and the swing rod is driven by the motor 54c, it is possible to reduce the size and easily add this configuration to the known X-ray inspection device 4.

Other components are similar to those of the above-described embodiment, and substantially the similar effects to those of the above embodiment can also be expected in the present embodiment.

In addition, in the present embodiment, in the insertion drive mechanism, by the reciprocating rotation of the motor 54c in response to, for example, the predetermined control signal RJ0-t2 from the PLC 55, rotational drive of the motor 54c and switching control of a rotation direction are performed through the drive circuit. Thus, the test piece insertion controller 53 can insert the foreign matter test piece tp into the irradiation X-ray region at a predetermined height position at a timing matching the article inspection period.

Furthermore, in the present embodiment, the height of the test piece stand 54a may be changed by changing the position at which the test piece stand 54a is supported by the swing rod 54b, which is advantageous in that it is possible to adjust the installation heights of the test piece stand 54a and the test piece tp in accordance with the height of the article P. In this case, it is preferable to adjust the rotational speed of the motor 54c in accordance with the distance from the main shaft of the motor 54c, and to match the movement speed of the test piece stand 54a when passing through the X-ray irradiation position with the conveyance speed of the article P. In addition, since the components of the test piece insertion controller 53 in the present embodiment are small and lightweight, it is possible to make the motor 54c displaceable in the article conveyance direction or the height direction and to easily adjust the attachment position.

In the above-described embodiment, the noise generator 51 for the inspection magnetic field in the metal detection device 2 has been described as the plurality of types of physical effect generators that generate a physical effect in the plurality of inspection sections Z1, Z2, and Z3 in the article inspection system 1, respectively. Instead of the noise generator 51, a mechanism that puts a metal piece into the inspection region may be provided, or it is conceivable to use a different noise generator together. Also, the weight position controller 52 attached to the weighing device 3 applies one of two weights having the same mass to the weighing scale 71 and the weighing stand 72 under the normal operation state. It is also conceivable to apply one or a plurality of weights among three or more weights of a plurality of types having different mass under the normal state, and to change the weights by a plurality of different weights to finely or greatly increase or decrease. Furthermore, as the test piece insertion controller 53 attached to the X-ray inspection device 4, it is conceivable to change the height of a horizontally rotating or horizontally sliding test piece stand by a height adjust mechanism of a support bracket of the test piece stand. In each of the embodiments, it is assumed that the rejection mechanisms 27 and 28 discharge a defective product from the article conveyance path to the outside. It is sufficient that the defective product rejection mechanism in the present invention rejects a defective product to a route separate from the non-defective product conveyance route.

As described above, in the article inspection verification system in the present invention, it is possible to provide an article inspection verification system that prevents a decrease in the operating rate associated with the verification work of the defect detection function of the article inspection device and reduces the burden in the verification work. Furthermore, in the inspection and sorting process of a manufacturing line configured by a plurality of types of article inspection devices, it is possible to reliably and efficiently realize the verification work. The present invention is useful for overall article inspection verification systems suitable for periodically verifying whether or not the defect detection function by article inspection is normal.

DESCRIPTION OF REFERENCE NUMERALS AND SIGNS

1 Article Inspection System (Article Inspection Line)
2 Metal Detection Device (Article Inspection Device, First Article Inspection Device, MD)
3 Weighing Device (Article Inspection Device, Second Article Inspection Device, CW)
4 X-Ray Inspection Device (Article Inspection Device, First Article Inspection Device, XR)
5 Article Inspection Verification System
10 Article Conveyance Path
11, 12, 13 Conveyor (Belt Conveyor)
15 Article Detection Sensor
16, 18, 19 Conveyor (Conveyance Route, Belt Conveyor)
17 Conveyor (Sorting Conveyor, Conveyance Route, Belt Conveyor)
20 Sorting Device
21, 22 Conveyor (Return Conveyance Conveyor, Return Conveyance Mechanism)
23 Camera
25 Sorting And Discharge Drive Circuit
27 Rejection Mechanism (Flipper Type Rejection Mechanism, First Defective Product Rejection Mechanism)
28 Rejection Mechanism (Flipper Type Rejection Mechanism, Second Defective Product Rejection Mechanism)
31, 33, 34 Operation Detection Sensor
32 Return Article Detection Sensor
35 Non-Defective Product Passage Detection Sensor
40 Management PC
41 Screen
42 Verification Information Storage Unit
51 Magnetic Field Fluctuation Generator (Physical Effect Generator)
52 Weight Position Controller (Physical Effect Generator, Weight Control Mechanism)
53 Test Piece Insertion Controller (Physical Effect Generator, Test Piece Movement Mechanism)
53a Test Piece Stand
53b Linear Motion Guide Rod
53c Bracket
54 Test Piece Insertion Controller (Physical Effect Generator, Test Piece Movement Mechanism)
54a Test Piece Stand
54b Swing Rod
54c Motor
55 PLC (Programmable Logic Controller, Physical Effect Control Unit)
55a CPU Unit (Arithmetic Control Unit)
55b Memory Unit (Various Memories)
55c Input Unit (Input Unit For Digital Input, Pulse Input, And Analog Input)
55d Output Unit (Output Unit For Digital Output, Pulse Output, And Analog Output)
55e Communication I/F (Communication Interface)
55f Power Source Unit
56 Information Terminal (Tablet Type Information Terminal, Programming Tool, Setting Input Switcher)
61 Loop Coil
62 Relay Circuit
63 Variable Resistor
64 Driver
66 Article Detection Sensor
71 Weighing Scale
72 Weighing Stand
73 Loading/Unloading Mechanism (Weight Loading/Unloading Mechanism)
81 X-Ray Irradiation Unit
82 X-Ray Detection Unit
82a X-RAY Line Sensor
CYL1, CYL2, CYL3 Air Cylinder
MC1, MC2, MC3 Linear/Rotational Motion Conversion Mechanism P Article (Inspection Target Article)
RJ0, RJ1, RJ2, RJ4, RJ5 Defect Detection Signal (Sorting Command)
RJ0-t1, RJ0-t2, RJ0-t4, RJ0-t5 Control Signal
V1, V2, V3 Air Supply/Exhaust Control Valve
Wt1, Wt2 Weight
Z1, Z2, Z3 Inspection Section
Zrj1/2, Zrj4/5 Defective Product Rejection Section

What is claimed is:

1. An article inspection verification system provided in an article inspection line including at least one article inspection device that inspects a quality state of an inspection target article passing through an inspection section on an article conveyance path and determines whether the inspection target article is a non-defective product or a defective product based on a predetermined determination condition, the system comprising:
 a physical effect generator that is attached to the article inspection device and generates a physical effect that causes the article inspection device to determine that the inspection target article passing through the inspection section is the defective product; and
 a physical effect control unit that stores a generation condition for the physical effect by the physical effect generator and drives the physical effect generator during an operation of the article inspection line in accordance with the generation condition,
 wherein the article inspection line includes a first article inspection device and a second article inspection device having different inspection types, the first and second article inspection devices functioning as the article inspection device, and
 wherein one of the article inspection devices is an X-ray inspection device that irradiates an inspection target article passing through the inspection section on the article conveyance path with X-rays, and performs article inspection based on rejection of transmitted X-ray amount,
 wherein the physical effect generator includes a first physical effect generator attached to the first article inspection device, a second physical effect generator attached to the second article inspection device, and a test piece movement mechanism that enters and retreats a test piece having a predetermined X-ray transmission characteristic into and from the inspection section in accordance with a control signal from the physical effect control unit.

2. The article inspection verification system according to claim 1, further comprising:
 a verification information storage unit that stores verification information indicating whether or not a defect detection operation of the article inspection device is normal, when the article inspection device determines the inspection target article passing through the inspection section within a specific period during the operation to be the defective product by the physical effect generator driving based on the generation condition.

3. The article inspection verification system according to claim 2, wherein:
 one of the article inspection devices is a metal detection device that detects a metal component in the inspection target article, and
 one of the physical effect generators is a magnetic field fluctuation generator that fluctuates a magnetic field in the inspection section in accordance with a control signal from the physical effect control unit.

4. The article inspection verification system according to claim 2, wherein:
 one of the article inspection devices is a weighing device that weighs the inspection target article, and
 one of the physical effect generators is a loading/unloading mechanism that adds or/and removes a weight load to or/and from a weight of the inspection target article in the inspection section in accordance with a control signal from the physical effect control unit.

5. The article inspection verification system according to claim 1, wherein
 the article inspection line includes, on a downstream side of the inspection section on the article conveyance path, a defective product rejection mechanism that moves the inspection target article determined to be the defective product in a direction away from a conveyance route of the non-defective product on the article conveyance path, and
 the article inspection verification system further comprises:
 a return conveyance mechanism that is provided between the inspection section and a defective product rejection section by the defective product rejection mechanism and moves the inspection target article to an upstream side of the article conveyance path while bypassing the inspection section, the inspection target article being determined to be the defective product by the physical effect from the physical effect generator when passing through the inspection section.

6. The article inspection verification system according to claim 1, wherein the physical effect control unit drives the physical effect generator with respect to at least one of the first physical effect generator attached to the first article inspection device and the second physical effect generator attached to the second article inspection device for a specific inspection target article.

7. The article inspection verification system according to claim 1, further comprising:
 a first defective product rejection mechanism that moves the inspection target article determined to be a defective product by the first article inspection device in a direction away from a conveyance route of the non-defective product on the article conveyance path, and a second defective product rejection mechanism that moves the inspection target article determined to be a defective product by the second article inspection device in the direction away from the conveyance route of the non-defective product on the article conveyance path, the first defective product rejection mechanism and the second defective product rejection mechanism being provided on a downstream side of the inspection section on the article conveyance path; and
 an operation detection sensor that detects operation states of the first defective product rejection mechanism and the second defective product rejection mechanism.

8. The article inspection verification system according to claim 1, wherein:
 one of the article inspection devices is a metal detection device that detects a metal component in the inspection target article, and
 one of the physical effect generators is a magnetic field fluctuation generator that fluctuates a magnetic field in the inspection section in accordance with a control signal from the physical effect control unit.

9. The article inspection verification system according to claim 8, wherein the physical effect control unit variably sets an output condition for the control signal to the physical effect generator in accordance with a type of the inspection target article.

10. The article inspection verification system according to claim 1, wherein:
one of the article inspection devices is a weighing device that weighs the inspection target article, and
one of the physical effect generators is a loading/unloading mechanism that adds or/and removes a weight load to or/and from a weight of the inspection target article in the inspection section in accordance with a control signal from the physical effect control unit.

11. The article inspection verification system according to claim 10, further comprising:
wherein the physical effect control unit variably sets an output condition for the control signal to the physical effect generator in accordance with a type of the inspection target article.

12. The article inspection verification system according to claim 1, wherein the physical effect control unit variably sets an output condition for the control signal to the physical effect generator in accordance with a type of the inspection target article.

13. An article inspection verification system provided in an article inspection line including at least one article inspection device that inspects a quality state of an inspection target article passing through an inspection section on an article conveyance path and determines whether the inspection target article is a non-defective product or a defective product based on a predetermined determination condition, the system comprising:
a physical effect generator that is attached to the article inspection device and generates a physical effect that causes the article inspection device to determine that the inspection target article passing through the inspection section is the defective product; and
a physical effect control unit that stores a generation condition for the physical effect by the physical effect generator and drives the physical effect generator during an operation of the article inspection line in accordance with the generation condition,
wherein the article inspection line includes a first article inspection device and a second article inspection device having different inspection types, the first and second article inspection devices functioning as the article inspection device,
wherein the physical effect generator includes a first physical effect generator attached to the first article inspection device and a second physical effect generator attached to the second article inspection device, and
wherein the article inspection verification system further comprises:
a first defective product rejection mechanism that moves the inspection target article determined to be a defective product by the first article inspection device in a direction away from a conveyance route of the non-defective product on the article conveyance path, and a second defective product rejection mechanism that moves the inspection target article determined to be a defective product by the second article inspection device in the direction away from the conveyance route of the non-defective product on the article conveyance path, the first defective product rejection mechanism and the second defective product rejection mechanism being provided on a downstream side of the inspection section on the article conveyance path; and
an operation detection sensor that detects operation states of the first defective product rejection mechanism and the second defective product rejection mechanism.

14. The article inspection verification system according to claim 13, wherein
the article inspection line includes, on a downstream side of the inspection section on the article conveyance path, a defective product rejection mechanism that moves the inspection target article determined to be the defective product in a direction away from a conveyance route of the non-defective product on the article conveyance path, and
the article inspection verification system further comprises:
a return conveyance mechanism that is provided between the inspection section and a defective product rejection section by the defective product rejection mechanism and moves the inspection target article to an upstream side of the article conveyance path while bypassing the inspection section, the inspection target article being determined to be the defective product by the physical effect from the physical effect generator when passing through the inspection section.

15. The article inspection verification system according to claim 13, wherein:
one of the article inspection devices is an X-ray inspection device that irradiates an inspection target article passing through the inspection section on the article conveyance path with X-rays, and performs article inspection based on rejection of transmitted X-ray amount, and
one of the physical effect generators is a test piece movement mechanism that enters and retreats a test piece having a predetermined X-ray transmission characteristic into and from the inspection section in accordance with a control signal from the physical effect control unit.

16. An article inspection verification system provided in an article inspection line including an article inspection device that inspects a quality state of an inspection target article passing through an inspection section on an article conveyance path and determines whether the inspection target article is a non-defective product or a defective product based on a predetermined determination condition, the system comprising:
a physical effect generator that is attached to the article inspection device and generates a physical effect that causes the article inspection device to determine that the inspection target article passing through the inspection section is the defective product; and
a physical effect control unit that stores a generation condition for the physical effect by the physical effect generator and drives the physical effect generator during an operation of the article inspection line in accordance with the generation condition,
wherein the article inspection line includes a first article inspection device and a second article inspection device having different inspection types, the first and second article inspection devices functioning as the article inspection device,
wherein the physical effect generator includes a first physical effect generator attached to the first article inspection device and a second physical effect generator attached to the second article inspection device,
wherein the article inspection devices includes a weighing device that weighs the inspection target article, wherein the physical effect generator includes a loading/unloading mechanism that adds or/and removes a weight load to or/and from a weight of the inspection target article in the inspection section in accordance with a control signal from the physical effect control unit, and wherein the physical effect control unit variably sets an output condition for the control signal to the physical effect generator in accordance with a type of the inspection target article.

\* \* \* \* \*